US010798112B2

United States Patent
Siddiqui et al.

(10) Patent No.: US 10,798,112 B2
(45) Date of Patent: Oct. 6, 2020

(54) ATTRIBUTE-CONTROLLED MALWARE DETECTION

(71) Applicant: FireEye, Inc., Milpitas, CA (US)

(72) Inventors: Mumtaz Siddiqui, Fremont, CA (US); Manju Radhakrishnan, San Jose, CA (US); Deepak Agarwal, Bangalore (IN)

(73) Assignee: FireEye, Inc., Milpitas, CA (US)

( * ) Notice: Subject to any disclaimer, the term of this patent is extended or adjusted under 35 U.S.C. 154(b) by 179 days.

(21) Appl. No.: 15/940,307

(22) Filed: Mar. 29, 2018

(65) Prior Publication Data

US 2018/0288077 A1    Oct. 4, 2018

Related U.S. Application Data

(60) Provisional application No. 62/479,208, filed on Mar. 30, 2017, provisional application No. 62/523,123, filed on Jun. 21, 2017.

(51) Int. Cl.
| | |
|---|---|
| *H04L 29/06* | (2006.01) |
| *G06F 21/56* | (2013.01) |
| *G06F 21/57* | (2013.01) |

(52) U.S. Cl.
CPC .......... *H04L 63/1416* (2013.01); *G06F 21/56* (2013.01); *G06F 21/577* (2013.01);
(Continued)

(58) Field of Classification Search
CPC .................................................. H04L 63/1416
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| | (Continued) | |

FOREIGN PATENT DOCUMENTS

| | | |
|---|---|---|
| GB | 2439806 A | 1/2008 |
| GB | 2490431 A | 10/2012 |
| | (Continued) | |

OTHER PUBLICATIONS

Venezia, Paul , "NetDetector Captures Intrusions", InfoWorld Issue 27, ("Venezia"), (Jul. 14, 2003).

(Continued)

*Primary Examiner* — Simon P Kanaan
(74) *Attorney, Agent, or Firm* — Rutan & Tucker, LLP

(57) ABSTRACT

A computerized method for authenticating access to a subscription-based service to detect an attempted cyber-attack. The method features operations by the cloud broker that include receiving service policy level information and information based on operational metadata. The service policy level information includes at least subscription attributes to identify one or more performance criterion in analyses conducted on one or more objects submitted by a sensor for malware representing an attempted cyber-attack. The operational metadata includes metadata that pertains to an operating state of one or more clusters of a plurality of clusters of the subscription-based service. The cloud broker, using both the service policy level information and the information based on the operational metadata, selecting a cluster of the plurality of clusters to analyze the one or more objects submitted by the sensor and establishes a communication session between the sensor and the cluster via the cloud broker.

42 Claims, 9 Drawing Sheets

(52) U.S. Cl.
CPC .............. *H04L 63/08* (2013.01); *H04L 63/145* (2013.01); *H04L 63/20* (2013.01); *G06F 2221/2115* (2013.01)

(56) References Cited

U.S. PATENT DOCUMENTS

| | | | |
|---|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B2 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,984,503 B2 | 7/2011 | Edwards |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |

(56) References Cited

U.S. PATENT DOCUMENTS

| | | |
|---|---|---|
| 8,381,299 B2 | 2/2013 | Stolfo et al. |
| 8,402,529 B1 | 3/2013 | Green et al. |
| 8,413,209 B2 | 4/2013 | Aldera et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,549,645 B2 | 10/2013 | Tang et al. |
| 8,555,391 B1 | 10/2013 | Demir et al. |
| 8,555,392 B1 | 10/2013 | Golovkin |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,578,491 B2 | 11/2013 | McNamee et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,683,593 B2 | 3/2014 | Mahaffey |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,763,127 B2 | 6/2014 | Yao et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shifter et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,027,138 B2 | 5/2015 | Glenn et al. |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,344,447 B2 | 5/2016 | Cohen et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,374,381 B2 | 6/2016 | Kim et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,450,840 B2 | 9/2016 | Denis |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,054 B2 | 12/2016 | Malachi |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |

(56) References Cited

U.S. PATENT DOCUMENTS

| | | |
|---|---|---|
| 9,832,216 B2 | 11/2017 | Kaloroumakis et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,284,574 B1 | 5/2019 | Aziz et al. |
| 10,284,575 B2 | 5/2019 | Paithane et al. |
| 10,335,738 B1 | 7/2019 | Paithane et al. |
| 10,341,363 B1 | 7/2019 | Vincent et al. |
| 10,366,231 B1 | 7/2019 | Singh et al. |
| 10,432,649 B1 | 10/2019 | Bennett et al. |
| 10,454,953 B1 | 10/2019 | Amin et al. |
| 10,467,414 B1 | 11/2019 | Kindlund et al. |
| 10,469,512 B1 | 11/2019 | Ismael |
| 10,476,906 B1 | 11/2019 | Siddiqui |
| 10,476,909 B1 | 11/2019 | Aziz et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,534,906 B1 | 1/2020 | Paithane et al. |
| 10,554,507 B1 | 2/2020 | Siddiqui et al. |
| 10,581,898 B1 | 3/2020 | Singh |
| 10,601,863 B1 | 3/2020 | Siddiqui |
| 10,616,266 B1 | 4/2020 | Otvagin |
| 10,623,434 B1 | 4/2020 | Aziz et al. |
| 10,637,880 B1 | 4/2020 | Islam et al. |
| 10,657,251 B1 | 5/2020 | Malik et al. |
| 10,671,721 B1 | 6/2020 | Otvagin et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |

(56) References Cited

U.S. PATENT DOCUMENTS

| | | |
|---|---|---|
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320562 A1 | 12/2008 | Creamer et al. |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |

(56) References Cited

U.S. PATENT DOCUMENTS

| | | |
|---|---|---|
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074143 A1 | 3/2013 | Bu et al. |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0232576 A1 | 9/2013 | Karnikis et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0036855 A1 | 2/2016 | Gangadharappa et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0197951 A1 | 7/2016 | Lietz et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2017/0300693 A1 | 10/2017 | Zhang et al. |
| 2017/0329968 A1 | 11/2017 | Wachdorf et al. |
| 2018/0013770 A1 | 1/2018 | Ismael |
| 2018/0048660 A1 | 2/2018 | Paithane et al. |
| 2018/0063177 A1 | 3/2018 | Yamada et al. |
| 2018/0121316 A1 | 5/2018 | Ismael et al. |
| 2018/0219891 A1 | 8/2018 | Jain |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |

(56) References Cited

FOREIGN PATENT DOCUMENTS

| | | |
|---|---|---|
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
PCT/US2018/025329 filed Mar. 30, 2018 International Search Report and Written Opinion dated Jun. 20, 2018.
"Mining Specification of Malicious Behavior"—Jha et al, UCSB, Sep. 2007 https://www.cs.ucsb.edu/.about_chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "Extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).

(56) References Cited

OTHER PUBLICATIONS

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

PCT/US2018/025329 filed Mar. 30, 2018 International Preliminary Report on Patentability dated Oct. 1, 2019.

U.S. Appl. No. 15/721,621, filed Sep. 29, 2017 Non-Final Office Action dated Jun. 21, 2019.

U.S. Appl. No. 15/721,630, filed Sep. 29, 2017 Notice of Allowance dated May 23, 2019.

U.S. Appl. No. 15/721,621, filed Sep. 29, 2017 Notice of Allowance dated Jun. 15, 2020.

U.S. Appl. No. 15/940,352, filed Mar. 29, 2018 Final Office Action dated Jul. 9, 2020.

U.S. Appl. No. 15/940,410, filed Mar. 29, 2018 Notice of Allowance dated May 15, 2020.

ATTRIBUTE-CONTROLLED MALWARE DETECTION

CROSS-REFERENCE TO RELATED APPLICATIONS

This application claims the benefit of priority on U.S. Provisional Application No. 62/479,208 filed Mar. 30, 2017 and U.S. Provisional Application No. 62/523,123 filed Jun. 21, 2017, the entire contents of which are incorporated by reference.

FIELD

Embodiments of the disclosure relate to the field of cybersecurity. More specifically, one embodiment of the disclosure relates to a scalable, subscription-based malware detection system.

GENERAL BACKGROUND

Cybersecurity attacks have become a pervasive problem for organizations as many networked devices and other resources have been subjected to attack and compromised. An attack constitutes a threat to security of stored or in-transit data that may involve the infiltration of malicious software (i.e., "malware") onto a network device with the intent to perpetrate malicious or criminal activity or even a nation-state attack.

Recently, malware detection has undertaken many approaches involving network-based, malware protection services. One approach involves "on-site" placement of dedicated malware detection appliances at various ingress points throughout a network or subnetwork. Each of the malware detection appliances is configured to extract information propagating over the network at an ingress point, analyze the information to determine a level of suspiciousness, and conduct an analysis of the suspicious information internally within the appliance itself. While successful in detecting advanced malware that is attempting to infect network devices connected to the network (or subnetwork), as network traffic increases, an appliance-based approach may exhibit a decrease in performance due to resource constraints.

In particular, a malware detection appliance has a prescribed (and finite) amount of resources (for example, processing power) that, as resource use is exceeded, requires either the malware detection appliance to resort to more selective traffic inspection or additional malware detection appliances to be installed. The installation of additional malware detection appliances requires a large outlay of capital and network downtime, as information technology (IT) personnel are needed for installation of these appliances. Also, dedicated, malware detection appliances provide limited scalability and flexibility in deployment.

An improved approach that provides scalability, reliability, and efficient and efficacious malware detection at lower capital outlay is desirable.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
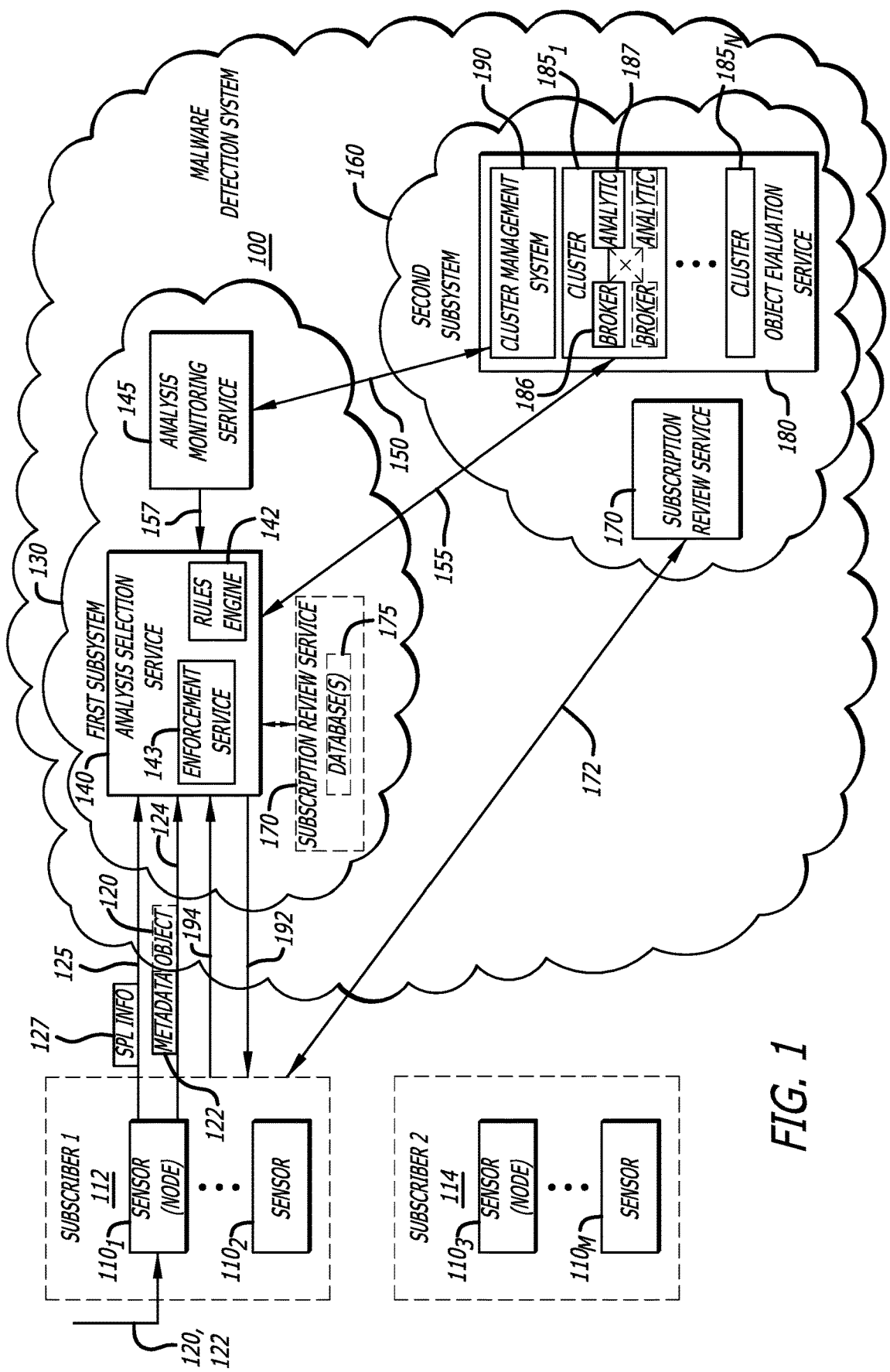
FIG. 1 is a block diagram of a first exemplary embodiment of a scalable, malware detection system.

Embodiments of the present disclosure generally relate to a subscription-based malware detection system, which includes a first subsystem and a second subsystem. Herein, the first subsystem may provide multi-tenancy through a cloud-based service that connects any number of subscribers to an object evaluation service, which is hosted by the second subsystem that is remotely located from the first subsystem. This multi-tenant, cloud-based service allows multiple subscribers to concurrently provide objects to the object evaluation service for malware detection.

Herein, a "subscriber" may be interpreted as a customer (e.g., an individual or an organization being a group of individuals operating, within the same or different company, governmental agency, department or division, etc.) with authorized access to the malware detection system. According to embodiments of the invention, the subscriber deploys one or more devices (e.g., sensor), which, after credential checks, may gain authorized access to the malware detection system via the first subsystem. "Multi-tenancy" refers to a system architecture in which a single IT resource (in this case, the malware detection system), can serve multiple tenants (customers), each with shared access with specific privileges to the resource. Implementations of the invention are designed with multi-tenancy controls to enforce per-tenant segregation of sensitive data and metadata to avoid its access by other tenants, while achieving statistical data aggregation benefits, as well as scalability, reliability, and efficient and efficacious malware detection at lower capital outlay. Also, in embodiments of the invention, per-tenant controls of the malware detection system and its object evaluation service are achieved based on subscription information, which may include subscription attributes, customer-configured attributes, factory set attributes, and/or operationally dynamically generated attributes, as described below.

In general, the object evaluation service includes one or more clusters (referred to as "cluster(s)") for use in analyzing objects provided by one or more sensors for malware and a cluster management system that monitors the operations of each cluster and controls its configuration. The cluster includes at least a broker compute node, as described below.

Deployed as a physical logic unit (e.g. a network device) or as a virtual logic unit (e.g., software operating on a network device), each sensor is configured to capture network traffic, including objects, perform a preliminary analysis on the objects, and provide objects deemed "suspicious" (e.g., meet or exceed a first probability of the object under analysis being malicious) to a selected cluster for in-depth analysis of the objects. A customer may subscribe to the malware detection system in order to utilize the object evaluation services through data submissions via one or more sensors as described below.

The second subsystem of the malware detection system may further include a subscription review service, which is configured to store a portion of the subscription information (referred to as "service policy level information") for use in selection of a cluster to analyze submitted objects and monitor operability of the selected cluster to confirm compliance with certain performance-based attributes. The performance-based attributes may pertain to any category of attribute such as certain subscription attributes (e.g., number or rate of object submissions, Quality of Service "QoS" levels guaranteed by a subscription tier, cluster availability, etc.) or certain customer-configured attributes (e.g., geographic location permissions or restrictions for compute nodes with the selected cluster in processing objects, type of remediation scheme, type of notification "alert" scheme, etc.).

According to one embodiment of the disclosure, the service policy level information includes an identifier to a customer (referred to as "Customer ID"), received in response to a granted request to subscribe to the object evaluation service. Some or all of the service policy level information may be provided to (i) a sensor, (ii) management system or web portal associated with the sensor, and/or (iii) a data store (e.g., one or more databases) that is accessible by one or more cloud brokers, as described below. During operation, the sensor communicates with the subscription review service to enroll and gain authorized access to the malware detection system. The subscription review service further coordinates an exchange of information with the cluster management system for updating software or other logic operating within one or more compute nodes (referred to as "compute node(s)") within the cluster(s) of the object evaluation service and/or within one or more sensors (referred to as "sensor(s)") in communication with the malware detection system.

According to one embodiment of the disclosure, the first (cloud-based) subsystem of the malware detection system features (i) an analysis selection service and (ii) an analysis monitoring service. The analysis selection service includes logic, referred to as a "cloud broker," which is responsible for both selecting a cluster to analyze objects that are submitted by a particular customer via a sensor and monitoring operability of the selected cluster to ensure compliance with the performance-based attributes e.g., associated with the subscription level selected by the customer. In particular, the analysis monitoring service is configured to communicate with the cluster management system to receive metadata associated with the cluster(s) operating as part of the second subsystem and/or metadata associated with compute nodes within the cluster(s). The metadata may include performance-based information (e.g., capacity, rate of analyses, number of analyses conducted, guest images utilized, etc.), derived from historical operational statistics and current status of the clusters. Based on this metadata, the analysis monitoring service generates information (referred to as "cluster selection values") for use, at least in part, by the cloud broker in selecting a cluster to process objects from a specific sensor and determining compliance with performance and/or operation thresholds for the tier of subscription selected.

More specifically, the analysis monitoring service includes logic, referred to as a "system monitoring logic," which is responsible for collecting metadata from the cluster management system that pertains to the operating state of (a) sensor(s) at a subscriber site, (b) cluster(s) that are part of the second subsystem, and/or (c) compute node(s) of a particular cluster or clusters. According to one embodiment of the disclosure, this metadata (referred to as "operational metadata") may include, but is not limited or restricted to, any or all of the following: cluster-based metadata, subscriber-based metadata, and/or compute node (CN)-based metadata (when the cluster management system is monitoring cluster specific activity), as described below. The receipt of the operational metadata may occur periodically or aperiodically. Also, the operational metadata may be received in response to a query message initiated by the system monitoring logic of the analysis monitoring service ("pull" method) or may be received without any prompting by the system monitoring logic ("push" method).

Responsive to receipt of operational metadata from the cluster management system (and optionally subscription information from the subscription review service), the system monitoring logic may generate and provide cluster selection values to the cloud broker. According to one embodiment of the disclosure, a rules engine within the cloud broker includes policy and routing rules that are designed to determine cluster and/or compute node availability based, at least in part, on the cluster selection values. Hence, the cluster selection values may influence which cluster is selected by the cloud broker to handle malware analysis of an object determined to be suspicious by a sensor of a customer who subscribes to services provided by the malware detection system.

Also, the policy and routing rules may be designed to confirm compliance by the malware detection system with respect to customer requirements specified by performance-based attributes associated with the selected subscription level and/or the customer-configurable attributes contained within the service policy level information for the customer. This confirmation may be accomplished by comparing values associated with certain operational metadata to values associated with certain attributes within the service policy level information.

In response to determining that the operability of the selected cluster is not compliant with the performance-based attributes and/or customer-configurable attributes for the selected subscription level (e.g., operability falls below a prescribed number of performance thresholds, falls below any performance threshold by a certain amount or percentage, etc.), the cloud broker may issue one or more alerts in efforts to remedy non-compliance.

A first alert may include a message sent to an on-premises management system or an endpoint controlled by an administrator of the customer's network. The message may identify one or more attributes that have not been satisfied in accordance with the service policy level information, e.g., associated with the current subscription level. In some cases, non-compliance may be remedied by increasing the current subscription level to increase entitled object processing capacity. In other cases, non-compliance may be remedied by reducing the current subscription level to save money with reduced protection being provided. Where the subscription level qualifies or permits the customer to submit a number or rate of objects for analysis, the first alert may notify the administrator that the number or rate has been exceeded, and the customer is notified to increase the subscription level accordingly to address non-compliance.

A second alert may include a message directed to an original equipment manufacturer (OEM) or third party hosting the object evaluation service identifying the performance issues causing non-compliance. In response to the second alert, the OEM or third party may provide a remedy by augmenting the selected cluster with more compute nodes or re-balancing workloads on the existing clusters/compute nodes (e.g., by re-enrolling the impacted sensor and/or other sensors contributing to the workload). Of course, the selected remedy may depend on what attributes have not been satisfied in accordance with the service policy level information associated with the current subscription level.

The cloud broker of the analysis selection service is configured to establish communication sessions between a sensor and a cluster, which may involve selection of a cluster (or selection of a particular compute node within that cluster) to handle analyses of suspicious objects detected by a specific sensor. The cloud broker relies on the policy and routing rules to select the pairing between the cluster and the specific sensor, where the selection of the cluster may be influenced by the cluster selection values from the system monitoring logic and/or service policy level information. The service policy level information may be provided from the specific sensor or accessible from one or more databases located within the first subsystem and/or the second subsystem using the Customer ID or an identifier of the sensor ("Sensor ID").

The cloud broker may also be responsible for reporting statistical information associated with analyses of suspicious objects and/or operability of particular cluster(s), particular compute node(s) or particular sensor(s). For example, the statistical information may be provided from the cluster management system within the second subsystem. Responsive to a request by the sensor for statistical information, the cloud broker may return a first type of aggregated statistical information to the sensor. The first type of aggregated statistical information allows network administrators for the subscriber to monitor performance of the malware detection system and/or compliance with service policy level guarantees based on the paid subscription. The cloud broker may return a second type of aggregated statistical information to a destination other than the sensor (e.g., the original equipment manufacturer "OEM" of the malware detection system, a third party entity, or another entity), which may be monitoring system performance.

It is contemplated that the cloud broker may include logic that returns analysis results for a previously analyzed object when a hash value of the previously analyzed object is highly correlated (e.g., identical or substantially corresponds) to a hash value of an object requested for analysis by a subscriber. This is a "cache" concept to avoid re-analyzing previously analyzed content and mitigate a likelihood of false positives or false negatives.

According to one embodiment of the disclosure, as previously described, the second subsystem includes the subscription review service, which includes licensing logic, enrollment logic and/or security content update logic. Collectively, the subscription review service confirms sensor enrollment as well as coordinates an exchange of information for use in updating operability of the malware detection system and/or the sensors. Prior to the malware detection system analyzing a data submission (e.g., object) from or returning statistical information to a sensor, the subscription review service may be requested to authenticate the sensor to confirm that the sensor (and/or the customer associated with the sensor) is authorized to use object analysis services provided by the malware detection system.

Hence, as described below in detail, a customer may submit a license request message for a subscription with a certain tier of service (subscription level) in consideration of desired attributes (e.g., desired network traffic capacity level, number of endpoints to be protected, etc.). Some of the attributes may be configured by the customer via an interface or portal (e.g., customer selected guest image "GI" preferences based on current OS/application types, notification (alert) scheme, remediation setting preference, etc.) while other attributes may be provided implicitly from the submission of the license request message (e.g., geographic location of the sensor by Internet Protocol (IP) or Media Access Control (MAC) address, GI preferences through analysis of installed software on the endpoint, etc.). This information associated with the attributes may be stored in one or more databases directly by or via the licensing/enrollment logic, and thereafter, maintained in or accessible by the cloud broker. The information may be accessed in the database via the Customer_ID, or, since the Customer_ID may be associated with one or more enrolled sensors (and their corresponding IDs), in some embodiments, a Sensor_ID may be used to access the information.

As described herein, a "cluster" is a scalable architecture that includes at least one compute node and allows additional compute nodes to be added as increased object analysis capacity is needed. A "compute node" includes logic that is configured to analyze suspicious objects that are detected by one or more sensors deployed at a subscriber site and submitted to the compute node via the analysis selection service located within the first subsystem of the malware detection system. The level (or threshold) for suspiciousness may be customer configurable (i.e., customer can adjust the sensitivity of the analysis based on available capacity or subscription level, the number or rate of false positives/negatives, or the like) or may depend on the type of object under analysis.

For example, according to one embodiment of the disclosure, the cluster may include a plurality of compute nodes, including at least (i) a compute node that operates as an "analytic" compute node by performing a malware detection analysis on a suspicious object and (ii) a compute node that operates as a "broker" compute node to select a particular analytic compute node within the cluster to analyze the suspicious object. The above-identified compute nodes may be the same compute node (e.g., different logic in same electronic device) or different compute nodes (e.g., different electronic devices or different logic within different electronic devices). For this embodiment, an analytic compute node of the cluster obtains metadata associated with a suspicious object via a broker compute node, and the metadata is used in the retrieval of the suspicious object for threat analysis by the analytic compute node. The classification of the suspicious object, in which a determination is made whether the object is associated with a cyber-attack or not, may take into account the analyses by the sensor (sensor analysis) and/or by the compute node (cluster analysis).

According to this embodiment, as described below, a sensor may be deployed at a subscriber site to monitor and evaluate information at that site. In particular, according to this embodiment, the sensor may be configured to capture incoming information, which is copied or intercepted during transit over a network (e.g., enterprise network or a public network where the intercepted information may include, for example, webpages downloaded by a user at the subscriber site or electronic messages transmitted to an email service provider over the Internet), conduct a preliminary analysis of incoming information, and route data submissions associated with suspicious objects (e.g., the suspicious objects themselves and/or metadata of the suspicious object) to a cluster within the second subsystem for more in-depth analysis of the object. During the preliminary analysis, the sensor may monitor, track or even intelligently control the number or frequency of data submissions to the cluster. Cluster selection prompted by a sensor requesting access to the malware detection system, along with maintenance of communications between the cluster and the sensor, are handled by the analysis selection service based, at least in part, on operational metadata received from the cluster management system via the analysis monitoring service.

Physically separate from the sensor, the cluster is responsible for analyzing suspicious objects that are part of the intercepted or copied information for malicious characteristics, namely the likelihood of a suspicious object being associated with malware. Prior to this analysis, logic within the sensor and/or the analysis selection service may conduct an initial determination as to whether (i) the object has already been submitted for malware analysis and/or (ii) a malware analysis has been completed for this object. In some situations, the results of a prior malware analysis may be returned to the sensor via the first subsystem.

I. Terminology

In the following description, certain terminology is used to describe features of the invention. In certain situations, each of the terms "logic", "logic unit," "engine," or "system" are representative of hardware, firmware, and/or software that is configured to perform one or more functions. As hardware, the logic (or engine or system) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic (or logic unit or engine or system) may be software in the form of one or more software modules. The software modules may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computerized" generally represents that any corresponding operations are conducted by hardware in combination with software and/or firmware.

The term "message" generally refers to information in a prescribed format and transmitted in accordance with a suitable delivery protocol such as HTTP (Hypertext Transfer Protocol); HTTPS (HTTP Secure); SSH (Secure Shell); SSH over SSL (SSH over Secure Socket Layer); Simple Mail Transfer Protocol (SMTP), File Transfer Protocol (FTP), iMES SAGE, Instant Message Access Protocol (IMAP), or another delivery protocol. Hence, each message may be in the form of one or more packets, frames, or any other series of bits having the prescribed format.

The term "cloud-based" generally refers to a hosted service that is remotely located from a data source and configured to receive, store and process data delivered by the data source over a network. Cloud-based systems may be configured to operate as a public cloud-based service, a private cloud-based service or a hybrid cloud-based service. A "public cloud-based service" may include a third-party provider that supplies one or more servers to host multi-tenant services. Examples of a public cloud-based service include Amazon Web Services® (AWS®), Microsoft® Azure™, and Google® Compute Engine™ as examples. In contrast, a "private" cloud-based service may include one or more servers that host services provided to a single subscriber (enterprise) and a hybrid cloud-based service may be a combination of certain functionality from a public cloud-based service and a private cloud-based service.

As briefly described above, the term "malware" may be broadly construed as any code, communication or activity that initiates or furthers a malicious attack (hereinafter, "cyber-attack"). Malware may prompt or cause unauthorized, anomalous, unintended and/or unwanted behaviors or operations constituting a security compromise of information infrastructure. For instance, malware may correspond to a type of malicious computer code that, as an illustrative example, executes an exploit to take advantage of a vulnerability in a network, network device or software, for example, to gain unauthorized access, harm or co-opt operation of a network device or misappropriate, modify or delete data. Alternatively, as another illustrative example, malware may correspond to information (e.g., executable code, script(s), data, command(s), etc.) that is designed to cause a network device to experience anomalous (unexpected or undesirable) behaviors. The anomalous behaviors may include a communication-based anomaly or an execution-based anomaly, which, for example, could (1) alter the functionality of a network device executing application software in an atypical manner; (2) alter the functionality of the network device executing that application software without any malicious intent; and/or (3) provide unwanted functionality which may be generally acceptable in another context.

In certain instances, the terms "compare," comparing," "comparison," or other tenses thereof generally mean determining if a match (e.g., a certain level of correlation) is achieved between two items where one of the items may include a particular pattern.

Both the term "node" and the term "network device" may be construed as an electronic device or software with at least data processing functionality and perhaps connectivity to a network. The network may be a public network such as the Internet or a private network such as a wireless data telecommunication network, wide area network, a type of local area network (LAN), or a combination of networks. Examples of a node or network device may include, but are not limited or restricted to any type of computer (e.g., desktop, laptop, tablet, netbook, server, mainframe, etc.), a mobile phone, a data transfer device (e.g., router, repeater, portable mobile hotspot, etc.), a wireless interface (e.g., radio transceiver or tuner, a firewall, etc.), or software or other logic type. Illustrative examples of a node or network device may include a sensor or a compute node (e.g., hardware and/or software that operates to receive information, and when applicable, perform malware analysis on that information). Also, an "endpoint" is a network device deployed at a subscriber site with access to a network to which a sensor may be communicatively coupled to monitor network traffic as well as incoming traffic (e.g., email) destined for the endpoint.

The term "transmission medium" may be construed as a physical or logical communication path between two or more nodes. For instance, as a physical communication path, wired and/or wireless interconnects in the form of electrical wiring, optical fiber, cable, bus trace, or a wireless channel using infrared, radio frequency (RF), may be used.

The term "data submission" includes metadata associated with an object that is determined to be suspicious and may be subjected to additional malware analysis. In addition to the metadata, the data submission may include one or more objects provided concurrently with or subsequent to the metadata. The term "object" generally relates to content (or a reference for accessing such content) having a logical structure or organization that enables it to be classified for purposes of malware analysis. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data.

The object and/or metadata may be acquired from information in transit (e.g., a plurality of packets), such as information being transmitted over a network or copied from the transmitted information for example, or may be acquired from information at rest (e.g., data bytes from a storage medium). Examples of different types of objects may include a data element, one or more flows, or a data element within a flow itself. A "flow" generally refers to related packets that are received, transmitted, or exchanged within a communication session while a "data element" generally refers to a plurality of packets carrying related payloads (e.g., a single webpage provided as multiple packet payloads received over a network). The data element may be an executable or a non-executable, as described above.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary block diagram of an illustrative embodiment of a subscription-based, malware detection system 100 is shown. Herein, the malware detection system 100 is communicatively coupled to one or more sensors $110_1$-$110_M$ (M≥1). The sensors $110_1$-$110_M$ may be located at a subscriber site 112 (e.g., located at any part of an enterprise network infrastructure at a single facility or at a plurality of facilities), or as shown, the sensors $110_1$-$110_M$ may be located at different subscriber sites 112 and 114. As illustrated, the malware detection system 100 may be separated geographically from any of the subscriber sites 112 and 114.

According to one embodiment of the disclosure, the malware detection system 100 includes a first subsystem 130 and a second subsystem 160. As shown in FIG. 1, the first subsystem 130 of the malware detection system 100 may be hosted as part of a public cloud-based service. The second subsystem 160 of the malware detection system 100 may be a private cloud-based object evaluation service operating as an analysis system, which is hosted by a cybersecurity provider or another entity different than the subscriber. Having a high degree of deployment flexibility, in the alternative, the malware detection system 100 can also be deployed as a fully public cloud-based service, as a fully private cloud-based service, or as a hybrid cloud-based service. This flexibility provides optimal scaling with controlled capital expense as well as the ability to control location(s) of deployments to satisfy governmental requirements, e.g., as to sensitive information (e.g., Personally Identifiable Information).

In FIG. 1, a sensor $110_1$ may be deployed as a physical logic unit or as a virtual logic unit (software) installed on a network device. When deployed as a physical logic unit, the sensor $110_1$ is identified by a sensor identifier ("Sensor_ID"), which may be based on the media access control (MAC) address or another unique identifier (e.g., serial number) assigned to the sensor $110_1$. However, when deployed as a virtual logic unit, the sensor $110_1$ may be preloaded with an activation code, which includes the Sensor_ID along with other credentials for communications with the malware detection system 100.

As further shown in FIG. 1, the sensors $110_1$-$110_2$ may be positioned at separate ingress points along the subscribing customer's network or subnetwork, or may be positioned in close proximity to one another, perhaps sharing the same hardware (e.g., power source, memory, hardware processor, etc.). For certain deployments, where the sensor $110_1$-$110_2$ are used as edge network devices for subnetworks, sensors may be used to monitor lateral infection between the subnetworks at the subscriber site 112. The sensors may serve as email proxies to receive email traffic being sent to computing assets protected by the customer in order to perform a security analysis.

When authenticated to access an object evaluation service 180 provided by the malware detection system 100 and a communication session to a selected cluster within the second subsystem 160 has been established, as described below, a sensor (e.g., sensor $110_1$) may conduct a preliminary analysis of data within an object 120 (e.g., data within a header or body of one or more packets or frames within monitored network traffic) to determine whether that object 120 is suspicious. The object 120 may include a portion of information (content) that is intercepted or copied from information being routed over a network. The object 120 may be "suspicious" upon detecting (i) the object 120 is sourced by or directed to a particular network device identified in a "blacklist" or (ii) the data within the object 120 features a suspicious data pattern. Hence, the preliminary analysis, in effect, controls the number and/or frequency of suspicious objects made available by the sensor $110_1$ for in-depth malware analysis by a selected cluster within the second subsystem 160. In some embodiments, all objects of a specific type of object (e.g., emails) are regarded as suspicious and sent for in-depth malware analysis, with the results of the preliminary analysis being available for used in the final determination of whether the object is associated with a cyber-attack.

Referring still to FIG. 1, with respect to the malware detection system 100, an analysis selection service 140 hosted within the first subsystem 130 is responsible for selecting a particular cluster (e.g., cluster $185_1$) of one of more clusters $185_1$-$185_N$ (N≥1), which is deployed within the second subsystem 160, to perform malware analysis of objects provided by a specific sensor (e.g., sensor $110_1$). The analysis selection service 140 selects the cluster $185_1$ based on an analysis of the service policy level information 127 and/or a portion of the operational metadata 150 (referred to as "cluster selection values 157") operating as inputs.

For example, according to one embodiment of the disclosure, upon receiving the cluster selection values 157 and/or the service policy level information 127, a rules engine 142 operates in accordance with policy and routing rules to select the cluster $185_1$, where the operational metadata associated with the selected cluster $185_1$ indicates that the cluster $185_1$ is able to satisfy performance or operation criterion set forth by subscription attributes and/or customer-configured attributes within the service policy level information 127. The policy and routing rules utilized by the rules engine 142 may be static, dynamic (modifiable and updateable) or a hybrid where some of the policy/routing rules are static while others are dynamic. For instance, the policy and routing rules of the rules engine 142 may be preloaded, but some of its rules may be modified or replaced over time. The frequency of the rule modifications may depend, at least in part, on results of prior malware detection by cybersecurity providers, changes in the cyber-threat landscape, and/or the types, targets, and techniques used in recent or potential cyber-attacks.

Hence, the analysis selection service 140 is configured to select the cluster $185_1$ to perform malware analyses on suspicious objects submitted by a sensor (e.g., sensor $110_1$) based, at least in part, on the service policy level information 127 within an analysis request message 125 and the operational metadata 150. The operational metadata 150 is received from the cluster management system 190 deployed within the second subsystem 160 via analysis monitoring service 145. As a result, the analysis selection service 140 controls the formation and maintenance of a communication session 155 between the particular cluster $185_1$ of the object evaluation service 180 and the sensor $110_1$ requesting the communication session 155.

After the communication session 155 has been established, logic within the analysis selection service 140 is configured to provide information associated with a suspicious object from the requesting sensor $110_1$ to the selected cluster $185_1$ within the object evaluation service 180 and to return results of a malware analysis on that suspicious object back to the requesting sensor $110_1$. This logic is identified as a "cloud broker" 610 in FIG. 6A.

As shown, the analysis monitoring service 145 receives, in a periodic or aperiodic manner, the operational metadata 150 from the second subsystem 160 (e.g., cluster management system 190). As shown, the operational metadata 150 may be received in response to a query message initiated by the analysis monitoring service 145 ("pull" method) or may be received without any prompting by the analysis monitoring service 145 ("push" method). A portion of the operational metadata 150 or information produced based at least in part on a portion of the operational metadata 150 (referred to as "cluster selection values 157") is made available to the rules engine 142 within the analysis selection service 140.

According to one embodiment of the disclosure, the cluster selection values 157 corresponds to information that (i) pertains to rule-based parameters utilized by the policy and routing rules and (ii) is generated from the operational metadata 150. As an example, the operational metadata 150 may include cluster queue size or queue length, cluster or compute node workload, cluster or compute node geographic location, and/or software profiles (e.g., guest images) supported for processing of the suspicious object 120 within one or more virtual machines hosted by the compute nodes within the cluster. Based on this example, the cluster selection values 157 may be values generated from the metadata (e.g., current queue length and/or cluster workload) that, when applied to the policy and routing rules controlling operation of the rules engine 142, identify which cluster or clusters are available to support another sensor and/or their level of availability. As an illustrative example, where the policy and routing rules include a rule that requires a cluster to have 30% queue capacity to service another sensor and the metadata identifies that the queue size is fifty storage elements and the current queue length is 15 storage elements, the cluster selection values 157 would identify that the cluster has 30% (15/50) capacity.

From other information (e.g., software profiles or geographic location), the cluster selection values 157 may be values that further refine the cluster selection process by identifying which cluster or clusters should be considered or precluded from consideration for data submissions involving a particular type of object. From still other information (e.g., compute node workload), the cluster selection values 157 may be values that further determine what broker compute node is to be selected for a particular cluster. Additionally, or in the alternative, the cluster selection values 157 may include or may be based on information associated with one or more sensors $110_1$, . . . , and/or $110_N$ based on prior communication sessions by the sensor(s) $110_1$, . . . , and/or $110_N$ such as sensor activity (e.g., number of submissions, amount of analysis time performed on objects by the particular sensor, number of malicious object detected for a particular sensor, or the like).

As described herein, the following operations are performed before the sensor (e.g., sensor $110_1$) is able to provide data for analysis (sometimes referred to as a "data submission 124") to the malware detection system 100: (a) sensor $110_1$ obtains service policy level information 127 that includes credentials such as the Customer_ID, user name, password, and/or keying material, as well as other parameters such as quality of service "QoS" information applicable to the Customer_ID that may specify, for example, the amount of time allocated per object analysis or any other factors that provide different levels of analysis or responsiveness per the subscription for the customer; (b) sensor $110_1$ is authenticated to access services provided by the malware detection system 100 using at least some of the service policy level information 127; (c) selection of a cluster (e.g., cluster $185_1$) to handle malware analyses for the sensor $110_1$ (based on incoming cluster selection values 157 and at least a portion of the service policy level information 127; and (d) communications with the cluster $185_1$ via the communication session 155 have been established.

According to one embodiment of the disclosure, the data submission 124 may include the object 120 and/or metadata 122 associated with the object 120. Herein, according to this embodiment, the data submission 124 includes the metadata 122 while the object 120 is temporarily stored by the sensor 110$_1$ and uploaded at a later time. For instance, the sensor 110$_1$ may later upload the object 120 to the object evaluation service 180 via the analysis selection service 140 for malware analysis. This upload may occur once the malware detection system 100 confirms, based on analysis of the metadata 122, that (a) the object 120 has not been analyzed previously and (b) a particular compute node within a selected cluster is ready to analyze the object 120. Alternatively, it is contemplated that the sensor 110$_1$ may concurrently upload the object 120 and its corresponding metadata 122 to the malware detection system 100 for processing.

As an optional service, an accounting and license enforcement service 143, separate from the licensing and enrollment services offered by the subscription review service 170, may be implemented in the first subsystem 130 and configured to monitor data submissions by the subscriber and account for all of the analysis and actions undertaken that exceed the terms of a license (subscription). The software associated with this service may further implement a "pay-as-you-go" licensing feature, which keeps track of all of the data submissions by a subscriber and charges based on usage of the malware detection system 100. This licensing feature provides for pre-payment of some reserved object analysis capacity, potentially at a cost savings.

Additionally, the accounting and license enforcement service 143 may be configured to confirm the current subscription status assigned to the customer associated with the sensor 110$_1$ that is attempting to upload the object 120 into the malware detection system 100 for analysis. This confirmation may be accomplished, for example, by accessing one or more databases 175 within the malware detection system 100 (e.g., within the second subsystem 160, within the first subsystem 130 such as within a portion of the subscription review service 170 hosted by the first subsystem 130, etc.) using the Sensor_ID or the Customer_ID provided by the sensor 110$_1$ as an index to obtain information pertaining to the customer's subscription. Alternatively, this confirmation may be accomplished by using the Sensor_ID to determine the Customer_ID within a Sensor_ID-Customer_ID mapping, and thereafter, conducting a database lookup using the Customer_ID.

More specifically, the confirmation of the current subscription status may involve a first determination as to whether the customer has an active subscription to the malware detection system 100. If the customer does not possess an active subscription to the malware detection system 100, the sensor 110$_1$ may be precluded from establishing a communication session and uploading information into the malware detection system 100 for analysis. If so, a second determination is conducted to access information, including service policy level information 127, which pertains to the customer's subscription.

The service policy level information 127 may include subscription attributes (e.g., subscription tier, QoS thresholds, permissions, access control information, details on cluster availability such as a listed default cluster, cluster selection ordering or preferences, cluster restrictions, etc.) and/or customer-configured attributes (e.g., geographic location permissions or restrictions for compute nodes in processing objects for the sensor 110$_1$, type of remediation identified by a remediation settings, notification scheme, etc.), or the like. Of course, it is contemplated that factory set attributes (e.g., default cluster, permissions, etc.), and/or operationally dynamically generated attributes that are dynamic based on past historical operations may be provided as part of the service policy level information 127 as well. It is contemplated that an OEM or third party hosting the object evaluation service may configure the service so that an attribute may be categorized as a subscription, customer-configured, factory set, or operationally dynamic attribute, where some customer-configured attributes allow customers to tailor operability that is not offered by the subscription level. The OEM or third party can decide which attribute or attributes should be configured in conjunction with which subscription level.

Additionally, the first subsystem 130 is configured to generate and transmit statistical information 192, which may be prompted in response to a management query message 194 (as shown) or provided without being in response to signaling from the subscriber site 112. The management query message 194 may correspond to a request for data that is directed to the operability of a particular sensor or the cluster(s). For instance, the statistical information 192 may be provided to a third party node or reporting logic deployed to operate as part of an on-premises (subscriber-based) management system (see system 606 of FIG. 6A) or a centralized management system (not shown) accessible by more than one subscriber site.

Figure 6A:
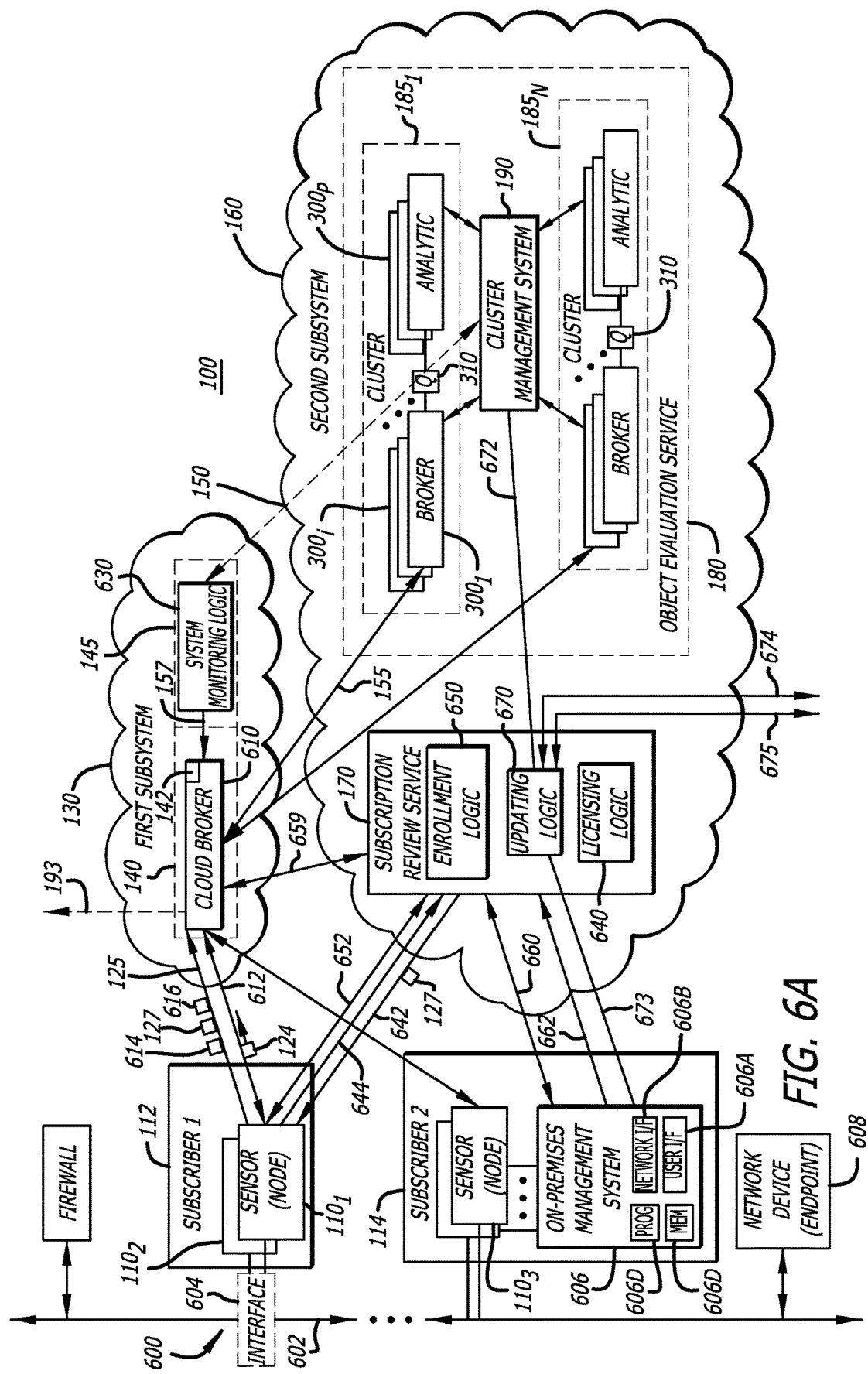
FIG. 6A is an embodiment of the operational flow conducted by the malware detection system of FIG. 1 in establishing communications with on-site sensors.

The on-premises management system 606, in some embodiments, is also responsible for receiving customer selections of available configurable attributes, as elsewhere described. As shown in FIG. 6A, the on-premises management system 606 includes a user interface (e.g., an interactive user interface) 606$a$, a network interface 606$b$, and may be implemented as software stored in memory 606$c$ that, which, when executed by one or more hardware processors 606$d$, performs the functionality described herein.

Referring back to FIG. 1, according to one embodiment of the disclosure, the second subsystem 160 includes the subscription review service 170 and the object evaluation service 180. Herein, the subscription review service 170 may be configured to enable the sensor 110$_1$ to obtain the service policy level information 127 through licensing services, authenticate the sensor 110$_1$ through sensor enrollment services as well as coordinate an exchange of information for use in updating operability of the malware detection system 100 and/or sensors 110$_1$-110$_M$. These authentication operations 172 are described below and illustrated in greater detail in FIGS. 6A-6B.

As shown, the subscription review service 170 is deployed within the second subsystem 160. However, it is contemplated that the subscription review service 170 may be deployed within the first subsystem 130 or partially within both subsystems 130 and 160. Furthermore, although not shown, the subscription review service 170 may be communicatively coupled to the analysis selection service 140 and/or the analysis monitoring service 145 to provide subscription information that may adjust operability of one or both of these services (e.g., increase or decrease QoS levels, decrease or increase analysis times, decrease or increase cluster availability, etc.).

The object evaluation service 180 includes one or more clusters 185$_1$-185$_N$ (N≥1). Each cluster 185$_1$-185$_N$ may be configured to conduct an analysis of a suspicious object (e.g., object 120) provided by one of the sensors 110$_1$-110$_M$ that is enrolled to the subscription-based malware detection system 100. As described above, each cluster 185$_1$, . . . , or 185$_N$ is a scalable architecture, which includes at least one compute node in which additional compute nodes may be added as needed to handle an increased number of object analyses caused by increased network traffic at a subscriber site (e.g., subscriber site 112).

According to one embodiment, the cluster $185_1$ includes a plurality of compute nodes, including (i) one or more compute nodes 186 each operating as a "broker" compute node and (ii) one or more compute nodes 187 each operating as an "analytic" compute node. Herein, a broker compute node 186 may be configured to determine, from received metadata 122 associated with the data submission 124 (e.g., hash value for the object 120), whether the suspicious object 120 has been previously processed by the malware detection system 100. If not, the suspicious object 120 is temporarily stored and is subsequently analyzed by at least one of the analytic compute node(s) 187 to determine whether the suspicious object 120 is associated with malware. The received metadata 122 may be used in the retrieval of the suspicious object 120. If the suspicious object 120 has been previously processed, however, the results of the prior analysis may be reported by the broker compute node 186 to the sensor $110_1$ via the first subsystem 130. In some embodiments, the sensor $110_1$ may provide the results to the on-premises management system 606 of FIG. 6A.

Alternatively, in lieu of the broker compute node 186 determining whether the suspicious object 120 has been previously processed, the first subsystem 130 may include logic that returns results from previously analyzed objects upon detecting a high correlation between metadata associated with the suspicious object 120 and metadata associated with a previously analyzed object. This logic may be implemented to avoid unnecessary analysis to improve response time and mitigate potential false positives or false negatives.

Figure 2:
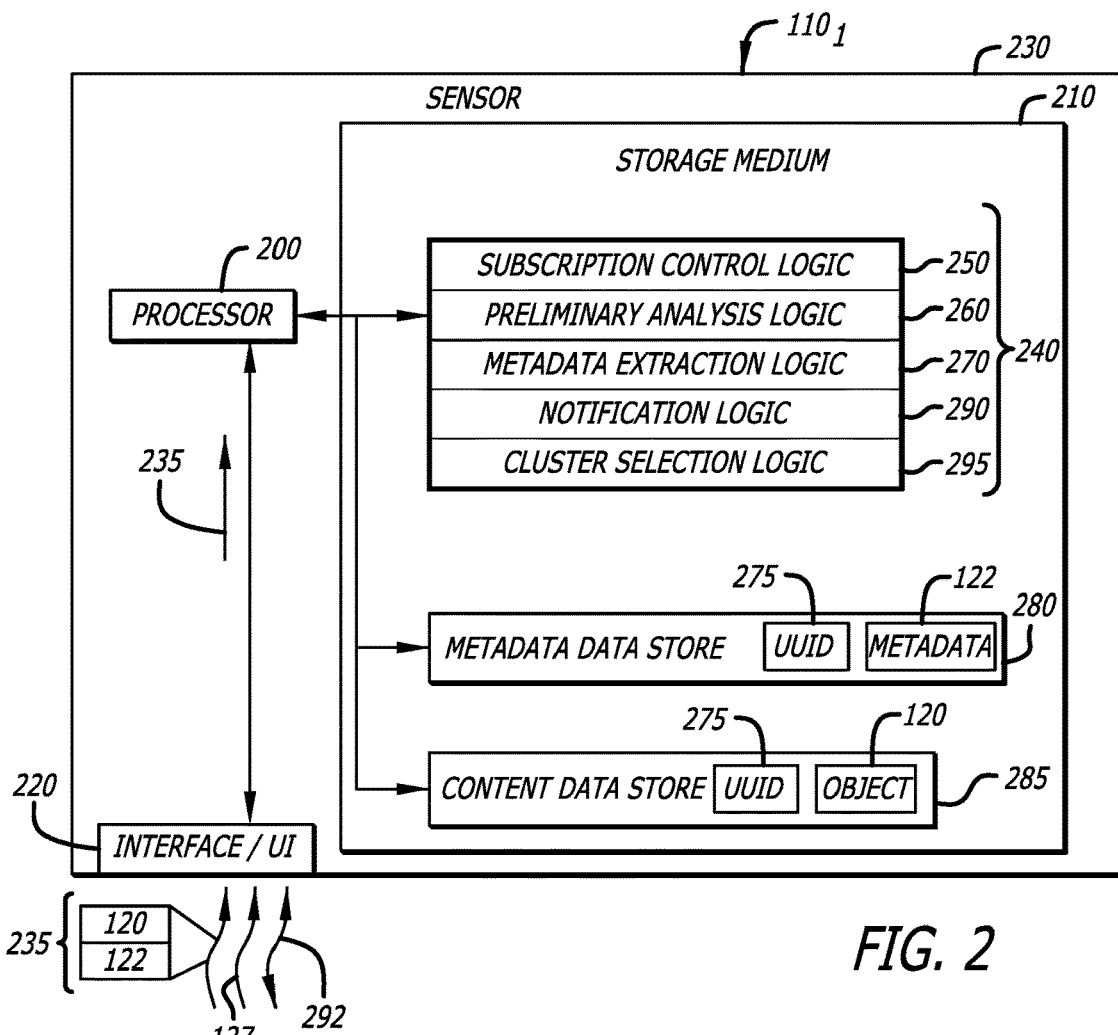
FIG. 2 is a block diagram of an exemplary embodiment of logic implemented within a sensor deployed within the malware detection system of FIG. 1.

Referring now to FIG. 2, a block diagram of an exemplary embodiment of logic implemented within a physical deployment of the sensor $110_1$ in communication with the malware detection system 100 of FIG. 1 is shown. According to this embodiment of the disclosure, the sensor $110_1$ comprises one or more hardware processors 200 (generally referred to as "processor"), a non-transitory storage medium 210, and one or more network interfaces 220 (generally referred to as "network interface"). These components are at least partially encased in a housing 230, which may be made entirely or partially of a rigid material (e.g., hard plastic, metal, glass, composites, or any combination thereof) that protects these components from environmental conditions.

In an alternative virtual device deployment, the sensor $110_1$ may be implemented entirely as software that may be loaded into a node or network device (as shown) and operated in cooperation with an operating system ("OS") running on the node. For this implementation, the architecture of the software-based sensor $110_1$ includes software modules that, when executed by a processor, perform functions directed to certain functionality of logic 240 illustrated within the storage medium 210, as described below.

The processor 200 is a multi-purpose, processing component that is configured to execute logic 240 maintained within the non-transitory storage medium 210 operating as a data store. As described below, the logic 240 may include, but is not limited or restricted to, (i) subscription control logic 250, (ii) preliminary analysis logic 260, (iii) metadata extraction logic 270, (iv) notification logic 290 and/or (v) cluster selection logic 295. One example of processor 200 includes an Intel® (x86) central processing unit (CPU) with an instruction set architecture. Alternatively, processor 200 may include another type of CPUs, a digital signal processor, an Application Specific Integrated Circuit (ASIC), a field-programmable gate array, or any other hardware component with data processing capability.

According to one embodiment of the disclosure, the sensor $110_1$ may include subscription control logic 250 that controls the signaling (handshaking) between licensing logic 640 and enrollment logic 650 of FIG. 6A. Such signaling enables the sensor $110_1$ to acquire credentials that are part of the service policy level information 127 of FIG. 1 (e.g., Customer_ID, username, password, keying material, etc.) as well as an uniform resource locator (URL) or other communication address for accessing the analysis selection service 140 of FIG. 1 and establishing communications with at least one cluster (e.g., cluster $185_1$) of the available clusters $185_1$-$185_N$. Additionally, the subscription control logic 250 may maintain information associated with a subscription expiration time that, if not extended through renewal, disables communications with the assigned cluster $185_1$ and/or signals a subscriber that renewal payments are due to continue the subscription to the malware detection system 100 (or upgrade to a more robust service policy level).

As shown, the network interface 220 is configured to receive incoming data 235 propagating over a network, including the metadata 122 and the object 120. The incoming data 235 may be received directly from the network or via a network tap or Switch Port Analyzer (SPAN) port, also known as a mirror port, provided by the sensor $110_1$. Processed by processor 200, the preliminary analysis logic 260 may conduct an analysis of at least a portion of the incoming data 235, such as the object 120 for example, to determine whether the object 120 is suspicious. Furthermore, the metadata extraction logic 270, during such processing, may extract metadata 122 from the incoming data 235 and assign an object identifier 275 to correspond to both the metadata 122 and the suspicious object 120. The object identifier 275 may be unique among the clusters $185_1$-$185_N$ (referred to as "universally unique identifier" or "UUID" 275).

The metadata 122 and UUID 275 may be stored in a metadata data store 280. The suspicious object 120 and UUID 275 may be stored in a content data store 285. The content data store 285 may be part of the non-transitory storage medium 210 of the sensor $110_1$. It is contemplated, however, that the content data store 285 may be located externally from the sensor $110_1$.

The sensor $110_1$ further includes notification logic 290, which is responsible for handling communications 292 with the selected cluster $185_1$ via the analysis selection service 140 of FIG. 1. Such communications 292 may include (i) analysis results or (ii) information that signifies (a) the suspicious object 120 has already been analyzed or (b) a timeout event has been detected for the metadata 122 that originated from the sensor $110_1$, where a "timeout event" denotes that the suspicious object 120 has not been analyzed by the object evaluation service 180 of FIG. 1 within a time allotted by the service policy level information 127 associated with the subscription for the customer or by the sensor $110_1$.

Operating in combination with subscription control logic 250 and/or preliminary analysis logic 260, the cluster selection logic 295 is adapted to select, based on the service policy level information 127 associated with the subscription for the customer, between on-premises cluster (or malware detection system) that resides on the same enterprise network as sensor $110_1$ (not shown) or an off-premises cluster within malware detection system 100 of FIG. 1. In this regard, the service policy level information 127 may have a customer-configurable attribute that specifies customer preferences regarding on-premises or off-premises cluster selection. Hence, depending on the selected default cluster, the on-premises cluster may be deployed to provide extra capacity when malware analysis thresholds established for cloud-based analyses allowed in accordance with the customer's subscription level have been exceeded.

Alternatively, the off-premises cluster may be deployed to provide extra capacity when malware analysis thresholds provided by the on-premises clusters have been exceeded. It is contemplated that routing decisions for the metadata 122 to either (i) on-premises cluster or (ii) off-premises cluster via the analysis selection service 140 may be based on any number of factors. These factors may include, but are not limited or restricted to object type (e.g., portable document format "PDF" objects are directed to an on-premises cluster and binaries are directed to off-premise cluster); client type (e.g., objects extracted from network traffic originating from certain customers, e.g., governmental agencies are directed to an on-premises cluster while objects extracted from network traffic originating from other governmental agencies are directed to an off-premises cluster); capacity (e.g., objects are directed to an off-premises cluster until a capacity (or subscription) threshold reached); and/or network security level (e.g., objects extracted from network traffic over protected subnetworks are directed to an on-premises cluster while objects extracted from network traffic over unprotected subnetworks are directed to an off-premises cluster).

Figure 4:
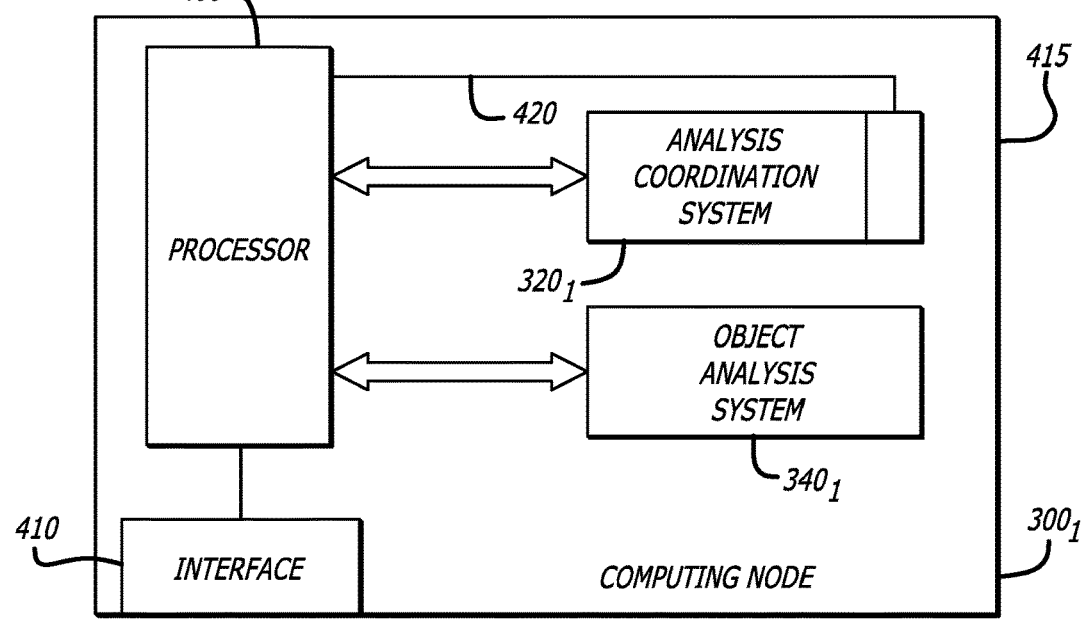
FIG. 4 is an exemplary embodiment of a compute node being part of the cluster of FIG. 3.
Figure 3:
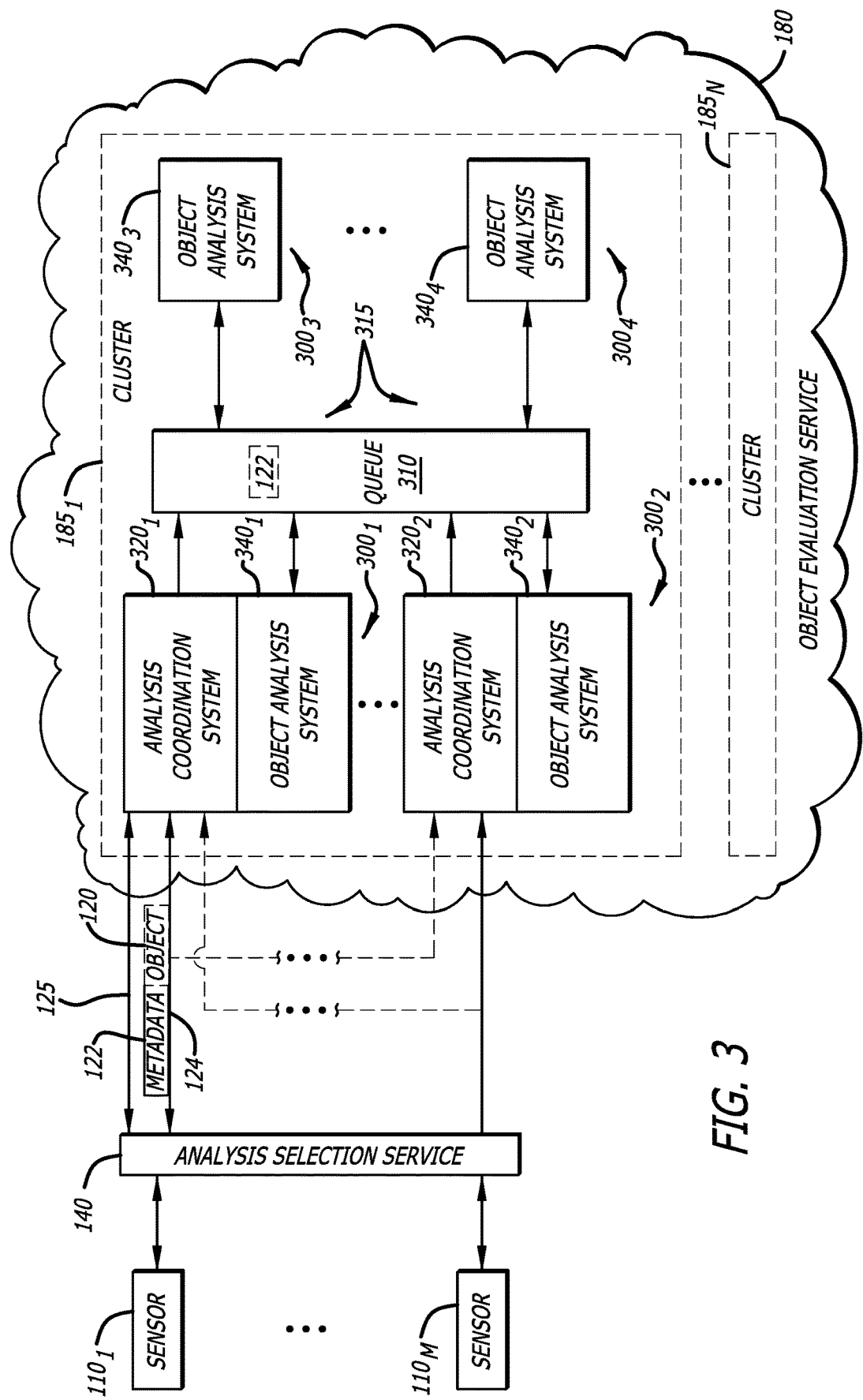
FIG. 3 is an exemplary embodiment of a cluster implemented within the object evaluation service hosted by the second subsystem of the malware detection system of FIG. 1.

Referring now to FIG. 3, an exemplary embodiment of logic implemented within the cluster 185$_1$ of FIG. 1 is shown. The cluster 185$_1$ comprises a plurality of compute nodes 300$_1$-300$_P$ (P≥1), which are communicatively coupled to a distributed queue 310 (e.g., a logical representation of the collective memory formed by queue memories for each cluster 185$_1$-185$_N$) over a first network 315. Each compute node (e.g., compute node 300$_1$) may feature an analysis coordination system 320$_1$ and an object analysis system 340$_1$. As shown in FIG. 4, analysis coordination system 320$_1$ may be activated or deactivated, such as activation or deactivation of a control line 420 by processor 400, where the compute node 300$_1$ operates as a "broker" compute node when the analysis coordination system 320$_1$ is activated or operates only as an "analytic" compute node when the analysis coordination system 320$_1$ is deactivated (e.g., compute nodes 300$_3$ and 300$_4$). As an alternative embodiment, it is contemplated that a "broker" compute node may have a logical architecture different than an "analytic" compute node. For example, a broker compute node may be configured with only an analysis coordination system. An analytic compute node may be configured with only an object analysis system.

According to exemplary embodiment of FIG. 3, sensors 110$_1$-110$_M$ are communicatively coupled to one or more broker compute nodes (e.g., compute node 300$_1$ and compute node 300$_2$) of the first cluster 185$_1$ via analysis selection service 140 of FIG. 1. Any of the analysis coordination systems 320$_1$ and 320$_2$ (e.g., system 320$_1$) may be selected by the analysis selection service 140 to receive metadata 122 from any of the sensors 110$_1$-110$_M$ (e.g., sensor 110$_1$) for storage within the distributed queue 310. The metadata 122 may be retrieved by an object analysis system 340$_1$-340$_4$ that is available for analyzing the suspicious object 120 associated with the metadata 122 for malware.

As further shown in FIG. 3, according to this embodiment of the disclosure, the difference between the "broker" compute nodes 300$_1$ and 300$_2$ and the "analytic" compute nodes 300$_3$ and 300$_4$ is whether or not the analysis coordination systems have been deactivated. Herein, for the "broker" compute nodes 300$_1$ and 300$_2$, analysis coordination systems 320$_1$ and 320$_2$ have been activated while the analysis coordination systems (not shown) for compute nodes 300$_3$ and 300$_4$ have been deactivated. It is noted, however, that all of the compute nodes 300$_1$-300$_4$ within the same cluster 185$_1$ feature an object analysis system 340$_1$-340$_4$, respectively. Each of these object analysis systems 340$_1$-340$_4$ includes logic that is capable of conducting an in-depth malware analysis of the object suspicious 140 upon determining to have sufficient processing capability.

More specifically, each object analysis system 340$_1$-340$_4$, when determined to have sufficient processing capability or otherwise determined to have suitable analytical capabilities to meet the required analysis (including that for the particular object and that which satisfies the service policy level information 127 associated with the subscription for the customer), accesses the queue 310 to obtain metadata 122 associated with the suspicious object 120 awaiting malware analysis. For example, during operation, the object analysis system 340$_1$ may periodically and/or aperiodically (e.g., in response to completion of a prior malware analysis) access the queue 310 and obtain the metadata 122 associated with the suspicious object 120. The metadata stored in the queue 310 may be prioritized for removal and subsequent analysis of their corresponding objects. For example, the prioritization of the queue 310 may be in accordance with object type (e.g., metadata associated with an object of a first type is queued at a higher priority than metadata associated with an object of a second type). As another example, the prioritization of the queue 310 may be in accordance with the service policy level assigned to the subscriber, namely metadata associated with an object submitted by a subscriber at a first service policy level (e.g., first QoS level) is queued at a higher priority than metadata associated with an object submitted by a subscriber at a second service policy level.

Upon retrieval of the metadata 122 and based on at least a portion of the metadata 122, the object analysis system 340$_1$ is able to determine the storage location of the suspicious object 120. Thereafter, the object analysis system 340$_1$ may retrieve the suspicious object 120. The suspicious object 120 may be stored in the sensor 110$_1$, in the compute node 300$_1$, or in an external network device (not shown) that may be accessed via the analysis selection service 140 of FIG. 1.

Upon receipt of the suspicious object 120, the object analysis system 340$_1$ conducts an in-depth malware analysis, namely any combination of behavior (dynamic) analysis, static analysis, or object emulation in order to determine a second level of likelihood (probability) of the suspicious object 120 being associated with malware. Such operations may involve execution of the suspicious object 120 within a virtual machine that is configured with one or more software profiles (e.g., one or more software components including operating system, application(s), and/or plug-in(s)) that allows the virtual machine to execute the suspicious object 120 and monitor behaviors of the virtual machine, including any of the software components. The second level of likelihood is at least equal to and likely exceeding (in probability, in computed score, etc.) a first level of likelihood. For example, the first level of likelihood may be expressed as a probability that exceeds a first threshold to find that the object 120 is suspicious and the second level of likelihood exceeds a second, higher threshold to find that the object is likely malicious and a cyber-attack is likely in process.

As an illustrative example, the analysis coordination system $320_1$ may be selected by the analysis selection service 140 of FIG. 1 to receive the metadata 122 associated with the suspicious object 120 and provide information, which may include some or all of the metadata 122, to the queue 310. Thereafter, the analysis coordination system $320_1$ has no involvement in the routing of such metadata to any of the object analysis systems $340_1$-$340_4$ of the compute nodes $300_1$-$300_4$. Instead, an object analysis system (e.g., object analysis system $340_3$) having sufficient processing capability and capacity to handle a deeper level analysis of the suspicious object 120 may fetch the metadata 122 that is stored in the queue 310 and subsequently fetch the suspicious object 120 based, at least in part, on a portion of the metadata 122.

Figure 5A:
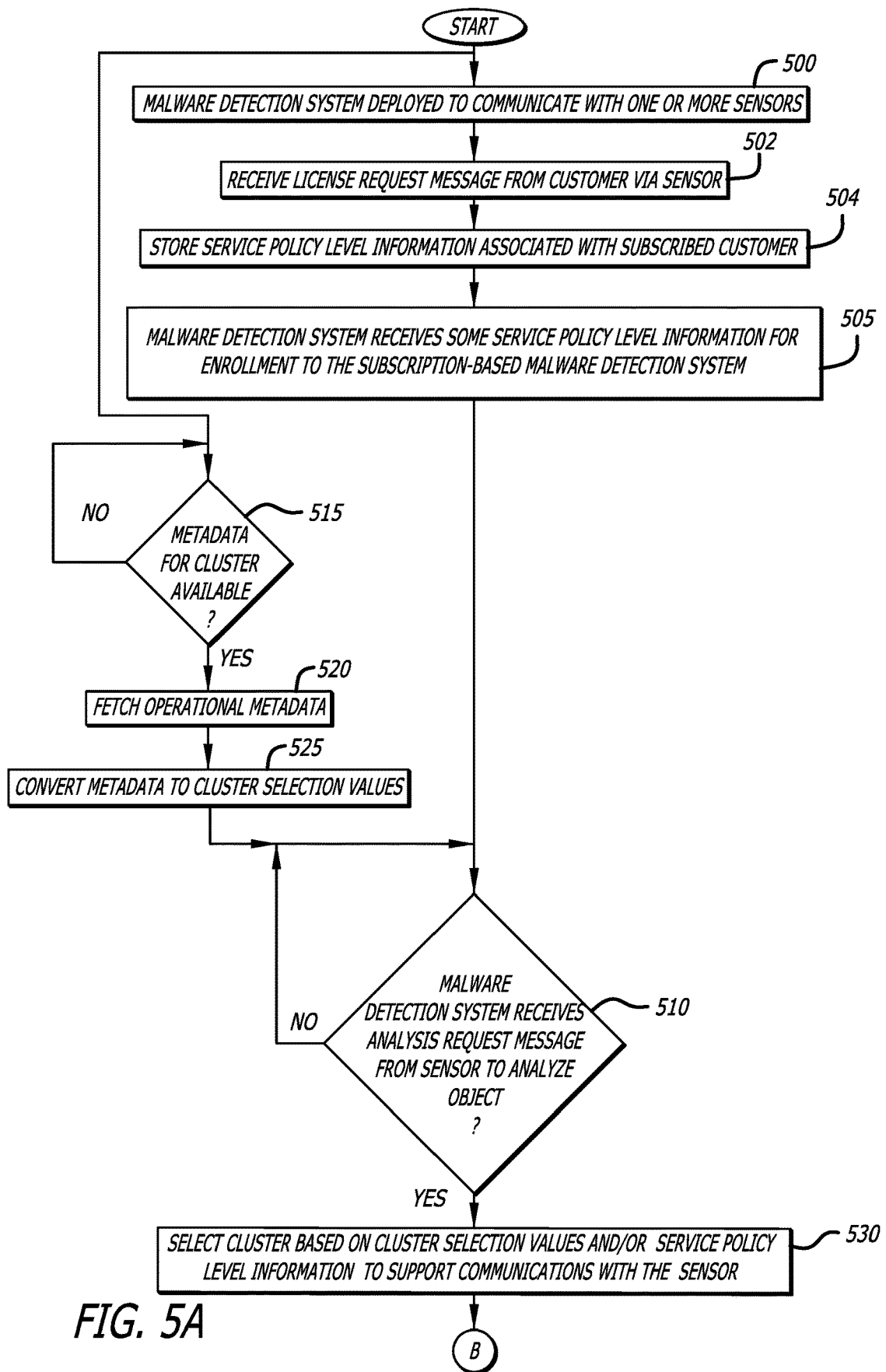
FIGS. 5A-5B are an exemplary flowchart of the general operations performed by the malware detection system of FIG. 1.
Figure 5B:
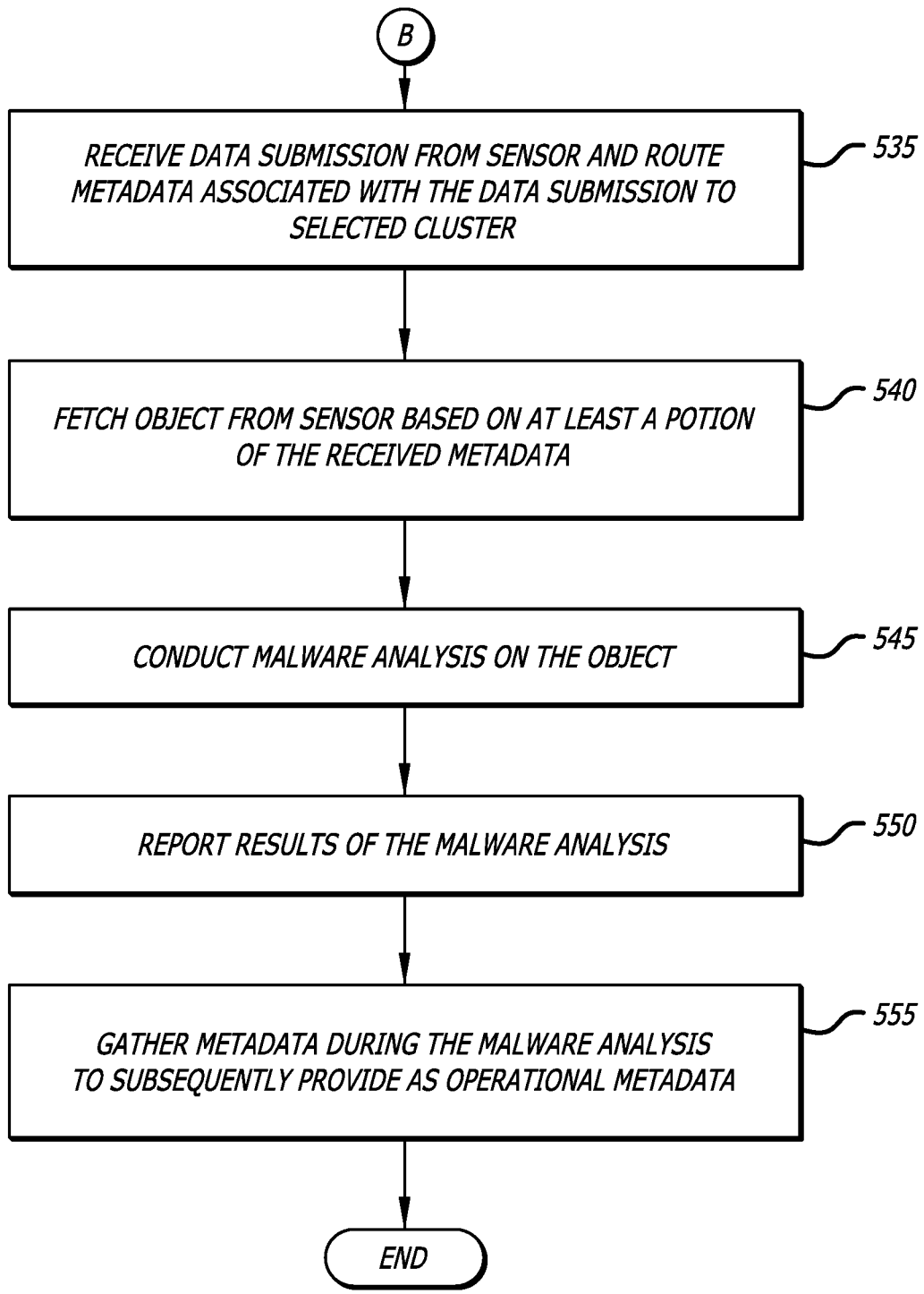

In summary, as shown in FIGS. 5A-5B, while referencing FIGS. 1-4, the malware detection system 100 is configured to communicate with one or more sensors $110_1$-$110_M$, where each sensor $110_1$-$110_M$ is configured to receive information that includes at least metadata 122 and a corresponding object 120 for malware analysis (block 500). The malware detection system 100 receives a license request message from the customer via a sensor, and in response to granting of the license request, the service policy level information associated with the customer is stored and accessible by the analysis selection service 140 within the malware detection system 100 (blocks 502 and 504).

Prior to forwarding a portion of the information to the second subsystem 160 for malware analysis, a sensor (e.g., sensor $110_1$) may complete its enrollment as an analysis logic for a subscriber (customer) of the subscription-based malware detection system 100, as described in reference to FIG. 6A (block 505). This enrollment scheme may involve a submission of credentials (e.g. Sensor_ID, Customer_ID, username, and/or password, etc.) to the subscription review service 170 for retrieval of information for accessing the analysis selection service 140 as illustrated in FIG. 6A (e.g., URL for accessing the cloud broker 610, etc.).

Figure 6B:
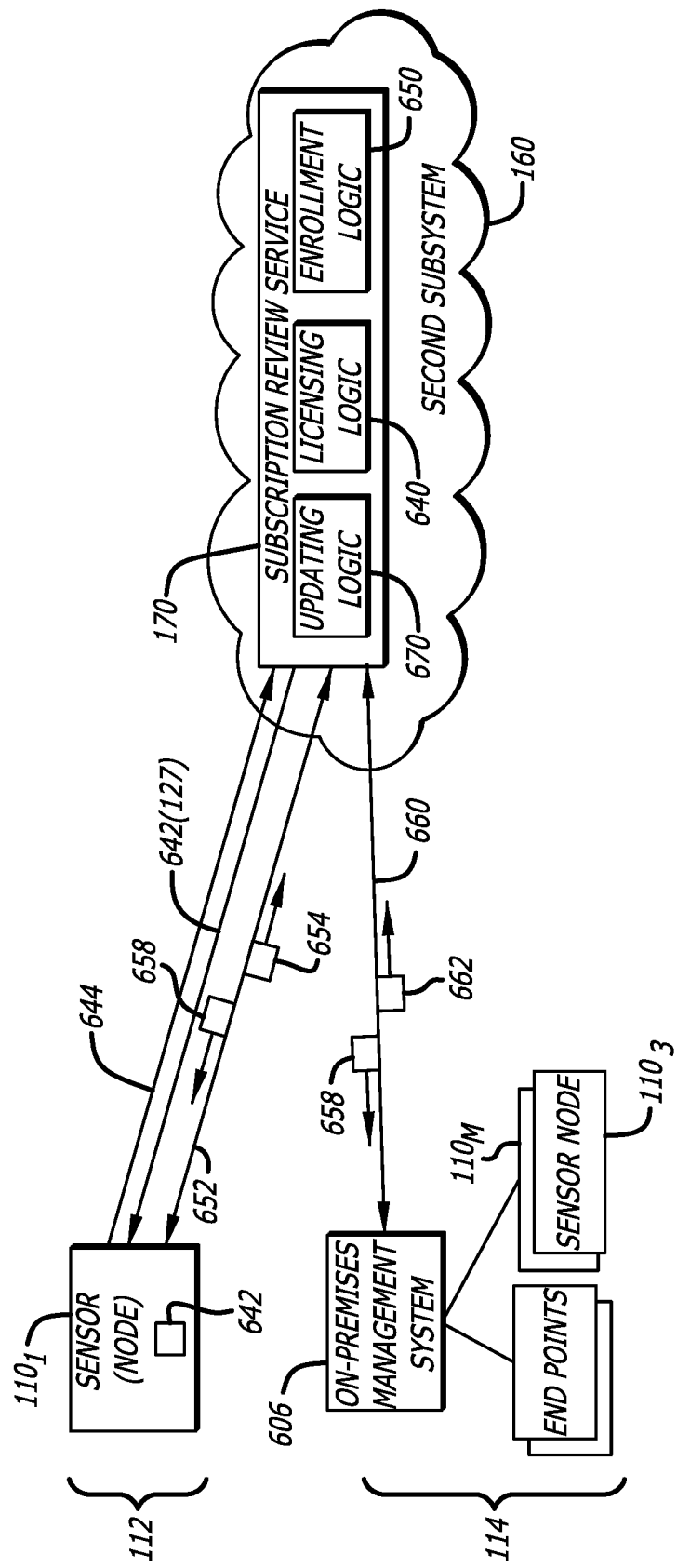
FIG. 6B is an embodiment of the operational flow between the sensors and the subscription review service of FIG. 1.

The analysis selection service 140 utilizes both the service policy level information 127 provided as part of or accessible based on information in the analysis request message 125 and the cluster selection values 157 to establish a communication session (e.g., tunnel) between the sensor (e.g., sensor $110_1$) and a selected cluster (e.g., cluster $185_1$) of the second subsystem 160, as illustrated in FIG. 6B (blocks 510, 515, 520, 525 & 530). As described herein, the cluster selection values 157 may correspond to information that pertains to rule-based parameters for policy and routing rules of the rules engine 142, and the cluster selection values 157 are generated from the operational metadata 150 acquired from the cluster management system 190 by the analysis monitoring service 145 and the service policy level information 127 associated with the subscription for the customer. In some implementations, the service policy level information 127 may be at a per-sensor granularity rather than a per-customer level. The cluster selection values 157 may be used in the selection of the particular cluster (e.g., cluster $185_1$) and/or a compute node (e.g., compute node $300_1$) within that particular cluster (e.g., cluster $185_1$) for analyzing objects from the sensor (e.g., sensor $110_1$).

As illustrated examples, the cluster selection values 157 relied upon for selection of the cluster (and/or compute node within the selected cluster) may pertain to values that collectively identify, when applied to policy and routing rules of the rules engine 142, what cluster or clusters have sufficient resources to support additional data submissions from a sensor. For example, the cluster selection values 157 may include values directed to cluster workload and/or cluster capacity. The cluster workload may be determined based, at least in part, on utilization levels of each of the compute nodes (e.g., compute nodes $750_1$-$750_P$) within that cluster (e.g., cluster $185_1$). The cluster capacity may be based, at least in part, on the distributed queue size for each cluster $185_1$-$185_N$ along with its current queue length (i.e., amount of queue (i.e., number of queue entries) that is not storing pertinent metadata). Additionally, or in the alternative, the cluster selection values 157 may include values directed to software profiles or geographic location of the sensor and/or cluster, that, when applied by the rules engine 142, may be used to determine which cluster or clusters is best suited for supporting the sensor (e.g., clusters that are geographically close to the sensor may be preferred for reduced transmission latency) and/or best satisfy the service policy level information (attributes) of the subscription for the customer.

The sensor (e.g., sensor $110_1$) receives incoming information for malware analysis. Specifically, the metadata extraction logic 270 of the sensor $110_1$ separates the metadata 122 from the object 120. Thereafter, the preliminary analysis logic 260 conducts an analysis to determine whether the object 120 is suspicious (e.g., meets a first prescribed level of likelihood that the object 120 is associated with malware). This preliminary analysis may include one or more checks (real-time analyses) being conducted on the metadata 122 and/or object 120 without execution of the object 120. Illustrative examples of the checks may include, but are not limited or restricted to the following: (i) bit pattern comparisons of content forming the metadata 122 or object 120 with pre-stored bit patterns to uncover (a) deviations in messaging practices (e.g., non-compliance in communication protocols, message formats, and/or payload parameters including size), (b) presence of content within the object 120 that is highly susceptible to or widely used by perpetrators for cyber-attacks, and/or (c) prior submission via the sensor $110_1$ of certain types of objects, and/or (ii) comparison between a representation of the object 120 (e.g., bit pattern representation as a hash of the object 120 or portions of the object 120) and stored representations of previously analyzed objects.

Prior to conducting an analysis to determine whether the object 120 is suspicious, it is contemplated that the preliminary analysis logic 260 within the sensor $110_1$ may determine whether a prior preliminary (or in-depth malware) analysis has been conducted on the object 120. In some instances, such as repeated benign or malicious objects or when a prior submission has recently occurred and such analysis has not yet completed, the sensor $110_1$ may discontinue further analysis of the object 120, especially when the prior preliminary (or in-depth malware) analysis has determined that the object 120 is benign (e.g., not malicious) or malicious (e.g., determined to have some association with malware) through one or more of the above-described checks. For some repeated benign or malicious objects, the sensor $110_1$ may simply report the results from the prior analysis. However, where the object 120 is an URL or another object type, especially an object with dynamically changing data as in URLs or documents with an embedded URL, the sensor $110_1$ may routinely supply the metadata 122 to its assigned broker compute node via the analysis selection service 140.

Herein, the metadata 122 may be an aggregate of metadata retrieved from the incoming data 235 of FIG. 2 along with additional metadata associated with the sensor $110_1$ itself. The metadata 122 is provided to one of the broker compute nodes (e.g., compute node $300_1$) of the cluster $185_1$ that is assigned by the analysis selection service 140 to conduct an in-depth malware analysis of a suspicious object to be subsequently submitted by the sensor $110_1$ (block 535). A portion of the metadata 122 may be used by an analytic compute node to retrieve the suspicious object 120 associated with the metadata 122 for processing within a virtual machine, monitoring behaviors of the object (and virtual machine) during such processing, and determining whether the object may be malicious based on these monitored behaviors (blocks 540 and 545). The analysis results may be returned to the sensor $110_1$ via the analysis selection service 140 (block 550). Metadata associated with this analysis (e.g., sensor identifier that requested analysis, cluster workload, object type, etc.) and other analyses may be collected by the cluster management system 190 for use by the analysis monitoring service 145 to assist the analysis selection service 140 in cluster assignment to sensors $110_1$-$110_M$ (block 555).

III. Operational Flow

Referring now to FIG. 6A, a more detailed embodiment of the operational flow in establishing communications between sensors $110_1$-$110_M$ and the malware detection system 100 of FIG. 1 is shown. According to this embodiment of the disclosure, the analysis selection service 140 of the first subsystem 130 includes a cloud broker 610 that is communicatively coupled to the system monitoring logic 630 of the analysis monitoring service 145, where the architecture of the cloud broker 610 and system monitoring logic 630, either individually or collectively, may include one or more hardware processors and memory including software that, when executed, performs their functionality described below. Alternatively, the cloud broker 610 and/or the system monitoring logic 630 may be deployed as software.

The second subsystem 160 features subscription review service 170, which includes licensing logic 640 along with enrollment logic 650 and security content updating logic 670. In accordance with one embodiment of the disclosure, the architecture of the subscription review service 170 may include one or more hardware processors and memory including licensing logic 640 along with enrollment logic 650 and security content updating logic 670 described below. Additionally, the object evaluation service 180 of the second subsystem 160 includes one or more clusters $185_1$-$185_N$, and/or cluster management system 190 to manage the organization of the cluster(s) $185_1$-$185_N$ and the configuration of the compute nodes (not shown) deployed within the clusters $185_1$-$185_N$. The architecture of the cluster management system 190 may include one or more hardware processors and memory including software that, when executed, performs its functionality described below. However, as alternative embodiments, the subscription review service 170 and/or some or all of the object evaluation service 180, including the cluster management system 190, may be deployed as software that is executed by the same or different hardware circuitry deployed within the second subsystem 160.

The sensors $110_1$-$110_M$ may be positioned at various locations on a transmission medium 602 that may be part of an enterprise network 600 (e.g., connected at various ingress points on a wired network or positioned at various locations for receipt of wireless transmissions). For an email threat detection embodiment, a sensor (e.g., sensor $110_2$) may be incorporated in a message transfer agent deployed in-line with the email traffic flow and between an anti-spam gateway and a network's internal mail server (e.g., Microsoft Exchange®). For use in a deployment involving a cloud-based messaging service, the email may be delivered to the sensor $110_2$ as a next-hop before the email reaches the internal mail server.

As shown in FIG. 6A, deployed as physical or virtual logic units, the sensors $110_1$-$110_2$ are located, e.g., at subscriber site 112, which may include an on-premises (subscriber-based) management system (as shown for subscriber site 114). The sensors $110_1$-$110_M$ are configured to monitor data traffic propagating over a network, such as the enterprise network 600 for example. The "traffic" may include an electrical transmissions as files, email messages, web pages, or other types of content.

More specifically, according to one embodiment of the disclosure, the sensor $110_1$ may be implemented as a network device or deployed as software within a network device that is coupled to the transmission medium 602 directly or is communicatively coupled with the transmission medium 602 via an interface 604 operating as a data capturing device. According to this embodiment, the interface 604 is configured to receive incoming data and subsequently process the incoming data, as described below. For instance, the interface 604 may operate as a network tap (in some embodiments with mirroring capability) that provides to the sensor $110_1$ at least one or more data submissions 124 acquired from network traffic propagating over the transmission medium 602. Alternatively, although not shown, the sensor $110_1$ may be configured as an in-line appliance to receive traffic (e.g., files or other objects) and to provide data submissions that are associated with "suspicious" objects for subsequent analysis. As yet another alternative, the sensor $110_1$ may be configured to receive information that is not provided over the network 600. For instance, as an illustrative example, the interface 604 may operate as a data capturing device (e.g., port) for receiving data submissions manually provided via a suitable dedicated communication link or from portable storage media such as a flash drive.

It is contemplated that the security content updating logic 670 may be communicatively coupled to (i) the cluster management system 190 via a first transmission medium 672 and (ii) one or more subscribed-based management systems (e.g., on-premises management system 606) via a second transmission medium 673. The cluster management system 190 is configured to manage a cluster or multiple clusters of the object evaluation service 180 while the on-premises management system 606 is configured to manage a sensor or multiple sensors of the subscriber site 114, as shown. Hence, updates to the functionality of components within the object evaluation service 180 (e.g., signatures, rules, executables, software patches, OS versions, plug-ins, etc.) may be propagated to the compute nodes $300_1$-$300_P$ via the cluster management system 190, which received the updates from the security content updating logic 670 via the first transmission medium 672. Similarly, updates to the functionality of components within the sensors $110_3$-$110_M$ may be propagated via the on-premises management system 606, which received the updates from the security content updating logic 670 via the second transmission medium 673. Furthermore, the security content updating logic 670 supports two-way communications to receive information associated with analysis results conducted by sensors or clusters with the malware detection system 100 via communication path 674 and/or analysis results from other sources outside of the malware detection system 100 via communication path 675.

A. Licensing and Enrollment

Referring now to FIGS. 6A-6B, to obtain access to the malware detection system 100, the sensor $110_1$ of the sensors $110_1$-$110_M$ may require a software license that includes software license (subscription) credentials 642 necessary for the sensor $110_1$ to communicate with the enrollment logic 650. Hence, in some embodiments, the customer requests to purchase a subscription, which is communicated to the subscription review service 170. For initiating the request, the customer may enter data via the user interface 606a of the on-premises management system 606 or a web portal, and typically will need to arrange or make payment of a subscription fee. The subscription review service 170 assigns an identifier to the customer (Customer_ID), maps the identifier of the sensor (Sensor_ID) to the Customer_ID, and further maps at least the service policy level information 127 provided by a paid subscription to the Customer_ID.

In some embodiments, the customer may be offered a plurality of tiers of subscription, each with an associated service policy level specified by a set of subscription attributes. For instance, a subscription attribute may specify a specific duration (or latency) allocated for an analysis of an object by the malware detection system 100 before the analysis times-out and for the classification of the object as malware or benign. Another subscription attribute may specify a maximum number of customer endpoints, e.g., laptops and other computers to be supported and protected against cyber-attacks by the malware detection system. Yet another subscription attribute includes a number and/or rate of data submissions allowed for the subscription tier selected. The subscription attributes are included in the service policy level information 127 of the subscription.

Moreover, the customer may also have an opportunity to select (e.g., via the user interface 606a) from among a set of customer-configurable attributes, which, though not dictated by the subscription type or tier, once selection, become associated with the subscription, included in the service policy level information 127, and used in in managing the object evaluation services 180 of the malware detection system 100. These customer-configurable attributes may include, by way of example, (i) a geographic location attribute that specifies the customer's preferred or required geographic location for the cluster used to analyze submission data from the customer, e.g., to protect sensitive information, and (ii) a guest image attribute that specifies one or more software profiles (e.g., brand and/or version of computer programs included in the software profiles) preferred or required by the customer.

More specifically, as shown, the sensor $110_1$ may acquire the software license credentials 642 by transmitting one or more license request messages 644 to licensing logic 640. The license request message(s) 644 may include information uniquely associated with the sensor $110_1$ (e.g., public Secure Shell "SSH" key assigned to the sensor $110_1$ or other keying material). Additionally, the license request message(s) 644 may include information associated with the customer and/or financial information to purchase the software license. The software license credentials 642 includes service policy level information 127, which includes subscription information pertaining to the customer that may be made available to the sensor $110_1$ and/or the on-premises management system 606 associated with that customer. As described above, the service policy level information 127 may include the Customer_ID along with information directed to a service policy (subscription) level of the customer represented by the Customer_ID (e.g., attributes such as QoS level, permissions, access control information, cluster availability for the current service level, remediation settings, geographic location permitted for compute nodes within a selected cluster, notification schemes, etc.) and other attributes.

After receipt of the software license credentials 642, to enroll for access to the malware detection system 100, the sensor $110_1$ of the sensors $110_1$-$110_M$ establishes a communication session 652 with the enrollment logic 650. During the communication session 652, as shown in FIG. 6B, the enrollment logic 650 receives an enrollment request message 654, which includes information that identifies the sensor $110_1$ (or the subscriber) at the subscriber site 112. The identifying information may include the Customer_ID, sensor identifier (ID), username, password, and/or keying material. Based on this information, the enrollment logic 650 authenticates the sensor $110_1$ through use of a directory (e.g., LDAP lookup), and upon authentication, returns a network address 658 to the sensor $110_1$, such as a uniform resource locator (URL) for example, for accessing the cloud broker 610 of FIG. 6A.

Additionally, as represented by transmission medium 659, the enrollment logic 650 may be communicatively coupled to the cloud broker 610 of FIG. 6A to directly provide an array of attributes, as briefly discussed above, associated with the subscribed customer and/or enrolled sensor $110_1$. The attributes may be used by the cloud broker 610 of FIG. 6A in assigning a cluster to handle malware analyses on objects provided by the enrolled sensor $110_1$ (e.g., selection of the cluster may be based on sensor location; sensor assigned QoS; customer subscription level; etc.). Besides subscription attributes, the attributes may include factory set attributes, customer configurable via a command line interface (CLI) or web user interface offered by the sensor or on-premises management system 606, or cloud-configured attributes via connectivity between a customer console (e.g., web portal) that can access cloud services. Additionally, one or more attributes (operationally dynamically generated attributes) may be generated dynamically during operation of the malware detection system, for example, an attribute may specify aspects of a history of communications (e.g., email or web downloads; number or rate of data submissions for in-depth analysis) with the sensor $110_1$, where the history may assist in the selection of the cluster for the enrolled sensor $110_1$.

As a result, as shown in FIG. 6A, the sensor $110_1$ may establish communications with the cloud broker 610 through transmission of the analysis request message 125 which, in turn, establishes the communication session 155 with the selected broker compute node (e.g., broker $300_1$). Thereafter, the sensor $110_1$ may provide a data submission 124 (including at least metadata 122) to commence analysis of the object 120. Of course, in the event that the sensor $110_1$ has not been authenticated via the enrollment logic 650, no data submissions by the sensor $110_1$ are forwarded by the cloud broker 610 to a selected cluster (e.g., cluster $185_1$) for processing.

Alternatively, in accordance with a second embodiment of the disclosure as shown in FIG. 6B, in lieu of a sensor directly interacting with the malware detection system 100 for enrollment, the on-premises management system 606 may be configured to indirectly enroll a sensor (e.g., sensor $110_3$). Communicatively coupled to the sensor $110_3$-$110_M$, the on-premises management system 606 monitors and/or controls operability of the sensor $110_3$-$110_M$ at subscriber site 114. In response to a triggering event occurring for sensor $110_3$, the on-premises management system 606 establishes a communication session 660 with the enrollment logic 650 on behalf of the sensor $110_3$. As described above, via the on-premises management system 606, the enrollment logic 650 authenticates the sensor $110_3$, where the authentication may include confirming that the sensor $110_3$ features an active license to the malware detection system 100. Such confirmation may be accomplished by, after receipt of an enrollment request message 662 via the on-premises management system 606 by enrollment logic 650, determining that the message 662 includes information stored in a database in the enrollment logic 650 that identifies the sensor $110_1$ and/or the customer associated with the sensor $110_3$ (e.g., Customer_ID, username, password, and/or keying material associated with the sensor $110_3$). Upon authentication of the sensor $110_3$, the URL 658 is acquired by the enrollment logic 650 and returned to the sensor $110_3$ via the on-premises management system 606.

B. Data Submission

Referring back to FIG. 6A, after successful enrollment, the sensor $110_1$ establishes the communication session 612 with the cloud broker 610 (illustrated separately from signaling that establishes the session 612). In particular, the sensor $110_1$ transmits an analysis request message 125 to the cloud broker 610, which operates as a proxy on a per sensor basis. According to one embodiment of the disclosure, the analysis request message 125 may include at least an identifier for the sensor $110_1$ (hereinafter, "Sensor_ID" 614) and some or all of the service policy level information 127. The Sensor_ID 614 may be used in selecting a cluster (e.g., cluster $185_1$) and a broker compute node of the cluster $185_1$ (e.g., broker node $300_1$) to handle malware analyses for the sensor $110_1$. The Sensor_ID 614 is also passed with the metadata 122 from the sensors $110_1$ for storage within the distributed queue 310 and subsequently retrieved from the queue 310 by one of the compute nodes $300_1$-$300_P$ for use (if needed) in retrieval of the corresponding object 120 for analysis. The Sensor_ID 614 accompanies the malware analysis results of the object 120, which are returned from the cluster $185_1$ to the sensor $110_1$, and the operational metadata 150 received from the cluster management system 190. A mapping between Sensor_IDs and their corresponding Customer IDs is accessible to the cloud broker 610 via the one or more databases described above.

Additionally, a portion of the service policy level information 127 (e.g., Customer_ID) may be used in controlling operation of the object evaluation service 180, such as selecting a cluster to handle malware analyses for the sensor $110_1$. However, according to this embodiment of the disclosure, the Customer_ID is not forwarded to the selected cluster $185_1$. Rather, using the Sensor_ID or the Customer_ID as a lookup parameter, the cloud broker 610 may be configured to access one or more databases within the malware detection system 100 (e.g., within the second subsystem 160) to collect subscription information that may influence cluster selection. Examples of the subscription information may include, but are not limited or restricted to subscription tier value, QoS threshold(s) based on the subscription level, cluster availability based on the subscription level (e.g., the default cluster for the subscription, cluster selection ordering or preferences if the default cluster is unavailable or is unable to satisfy the QoS threshold(s), cluster restrictions, etc.), geographic location permissions or restrictions for compute nodes associated with the selected cluster, remediation setting (e.g., type of remediation) set for the customer, customer notification scheme preference, and other attributes.

It is contemplated that the entire communication session 155/512 between the sensor $110_1$ and the cluster $185_1$ via the cloud broker 610 may remain active until a session termination event has occurred. One example of a session termination event may occur in response to the sensor $110_1$ detecting that its local data store has no suspicious objects currently awaiting processing by object evaluation service 180. Detection of this event may cause the sensor $110_1$ to terminate the existing communication session 612 with the cloud broker 610. As another example, a session termination event may occur when the communication session 612 between the sensor $110_1$ and the cloud broker 610 has been active for a duration that exceeds a prescribed period of time or a scheduled take-down of the selected cluster $185_1$ is to occur. The monitoring of the duration of the communication session 612 may be handled by the cloud broker 610, sensor $110_1$, or its on-premises management system 606, in conjunction with the cluster management system 190. The termination of the communication session 612 may be handled once all suspicious objects from the sensor $110_1$ that were awaiting analysis by the selected cluster $185_1$ prior to the session termination event have been completed.

Referring still to FIG. 6A, the system monitoring logic 630 is communicatively coupled to the cloud broker 610 of the first subsystem 130 and the cluster management system 190 of the second subsystem 160. Configured to provide the cloud broker 610 with sufficient visibility of cluster and/or sensor operability, the system monitoring logic 630 collects, on a periodic or aperiodic basis, the operational metadata 150 from the cluster management system 190. Thereafter, the system monitoring logic 630 provides the cloud broker 610 with either access to a portion of the operational metadata 150 or with cluster selection values 157 that can be based on at least portions of the operational metadata 150 representing the operability and availability of the clusters $185_1$-$185_N$ hosted by the object evaluation service 180 and on the service policy level information 127 associated with the subscription for the customer (e.g., attributes associated with a particular sensor or a subscriber such as QoS level, permissions, access control information such as URL for accessing the cloud broker 610, etc.).

According to one embodiment of the disclosure, the cluster selection values 157 may be based on cluster-based metadata, e.g., metadata representing the availability of each cluster $185_1$-$185_N$ to analyze an incoming object for malware. For example, the cluster selection values 157 may be based on cluster queue size and cluster workload. The cluster selection values 157 may also or alternatively include information that represents a higher level of specificity than the foregoing cluster-based metadata, e.g., subscriber-based metadata and/or compute node (CN) based metadata.

Examples of the cluster-based metadata, subscriber-based metadata and CN-based metadata include some or all of the following:

Cluster-Based Metadata:

Operational information regarding the cluster(s), including (i) workload (e.g., cluster workload or utilization level, etc.); (ii) location (e.g., cluster geographic location, etc.); (iii) configuration (e.g., software profile(s) supported by cluster, etc.); and/or (iv) storage capacity (e.g., queue size for use in storage of metadata awaiting processing to prompt fetching of the corresponding object, etc.).

Subscriber-Based Metadata:

Operational information regarding the customer(s) or one or more of the sensors of the customer(s), including: (i) submission rate (e.g., number of objects submitted (per sensor or per subscriber) over a given time period or other aggregate, rate of submission over a given time period such as number of objects submitted" divided by "given time period," etc.); (ii) submission type (e.g., types of objects submitted (per sensor or per subscriber) over a given time period or other aggregate, etc.); and/or (iii) detection rate (e.g., number of submitted objects determined as potentially malicious by a cluster over a given time period or other aggregate, etc.).

CN-Based Metadata:

(i) node workload (e.g., workload or utilization level of a particular compute node "CN", etc.); (ii) location (e.g., geographic location of the particular CN, etc.); (iii) configuration (e.g., software profile(s) supported by the particular CN, etc.); and/or (iv) rate of submission (e.g., "number of objects" divided by "given time period" by the particular CN).

It is contemplated that the system monitoring logic 630 may include a software module (e.g., a rule-based routine) that is configured to receive the service policy level information 127 (e.g., customer preferences) that may influence the selection of a cluster and/or a compute node within that selected cluster. For instance, as an illustrative example, the system monitoring logic 630 may be accessible by the customer or a third party associated with the customer via the cloud broker 610. The cloud broker 610 may provide a web-based interface, which includes subscriber-selectable preferences for object processing (e.g., types of software profiles, workload thresholds, geographic location based on sensor location, etc.). The access by the customer may be effected via the on-premises management system 606 or other computer system or device. Upon selection, the service policy level information 127 may be passed to the system monitoring logic 630. As an illustrative example, the customer (or third party) may select only compute nodes that feature a certain software profile or certain software profiles to conduct virtual machine-based behavioral analysis of an object for malware originating from the subscriber's network, thereby eliminating those clusters that do not feature compute nodes with the software profile(s). Additionally, or in the alternative, compute node selection may be at least partially performed automatically (without subscriber input) based on at least a portion of the service policy level information 127 (e.g., Customer_ID), which may restrict or enlarge the types of compute nodes or groupings of compute nodes based on subscription level, geographic location based on the location of sensor having the object for submission, etc.).

In order to ensure compute node configurability, the system monitor logic 630 may be configured to provide cluster selection values 157 that include metadata used by the cloud broker 610 to control what compute node or compute nodes are permitted to process submitted objects from a particular subscriber. For instance, this metadata (e.g., a portion of metadata 122 as illustrated in FIG. 1), which is used in the retrieval of an object for malware analysis, may signal the cloud broker 610 to appropriately tag the metadata 122 prior to transmission to a targeted broker compute node (e.g., broker compute node $300_1$) of a selected cluster for temporary storage in the cluster queue 310. The tag may be used to identify preferred or requisite compute nodes (or group of compute nodes) for recovery of the metadata 122 for subsequent retrieval of a corresponding object for malware analysis. Each compute node (e.g., compute $300_1$), when accessing the cluster queue 310 to retrieve metadata, may scan the queue 310 for a prescribed time or prescribed number of entries (e.g., less than 10) to determine whether any of the queued metadata is targeted for exclusive handling by that compute node $300_1$ (or a group of which the compute node is a member). If so, the compute node $300_1$ may retrieve that metadata thereby deviating from a first-in, first-out (FIFO) queue retrieval scheme.

The FIFO retrieval scheme may be the default retrieval scheme for all compute nodes (e.g., compute node $300_1$-$300_P$) in a cluster (e.g., cluster $185_1$) in some embodiments. In such embodiments, upon completing processing of an object, the compute node $185_1$ simply retrieves the metadata of the next entry in the queue 310 that remains unprocessed and available for processing by a compute node. In other embodiments that are equipped to provide certain subscribers premium service with reduced latency, one or more of the compute nodes of a cluster may be preselected (or an entire cluster is selected) to deviate from a FIFO retrieval scheme, whereby each of these compute node(s) seeks to next process an entry tagged as being from premium service customers. For example, these compute node(s) may check for the next tagged entry in the queue 310 corresponding to such premium service or premium service subscriber, and process that entry. In some embodiments, the compute node(s) may check only "n" next entries in the queue 310, where the number "n" is a positive integer, and if such an entry is not found, returns to retrieval of the metadata through a FIFO scheme by default so as to select the least recent (top) available entry.

Upon receipt of the cluster selection values 157, the cloud broker 610 is better able to select a cluster (e.g., cluster $185_1$) from the cluster $185_1$-$185_N$ for handling analyses of objects from the sensor $110_1$, where such selection is governed by policy and routing rules within the rules engine 142. The selection of the cluster (e.g., cluster $185_1$) may be based, at least in part, on the cluster selection values 157 and/or content within the analysis request message 125 itself (e.g., service policy level information 127) as applied to the policy and routing rules by the rules engine 142 (see FIG. 7) within the cloud broker 610. Stated differently, the cluster selection values 157 provided from the system monitoring logic 630 and/or at least a portion of the service policy level information 127 provided from the sensor $110_1$ or accessed from a data store accessible by the cloud broker 610 (e.g., one or more databases) operate as input for the policy and routing rules within the rules engine 142. Upon selection of the cluster, a new communication session (e.g., tunnel) is established between the cloud broker 610 and one of the broker compute nodes within the cluster $185_1$ for receipt of data submissions from the sensor $110_1$.

Additionally, the policy and routing rules controlling operations of the cloud broker 610 may be designed to confirm compliance with one or more performance and/or operation thresholds for the selected subscription level by comparing values associated with certain cluster selection values 157 (or operational metadata 150) to values associated with certain attributes within the service policy level information 127. In response to determining that the operability of the cluster $185_1$ is not compliant with performance and/or operation thresholds for a subscription level selected by the customer (e.g., failure to satisfy a prescribed number of performance thresholds or a particular performance threshold, number of submissions exceeds a prescribed maximum, etc.), the cloud broker may issue an alert to the sensor $110_1$ regarding detected non-compliance. The alert may include a message that is routed to an on-premises management system or an endpoint 608 controlled by an administrator provides one or more suggestions to improve performance (e.g., increase capacity through an increased subscription level, sensor-cluster rebalancing, decrease configurable analysis parameters such as analysis time per object or number of analyses performed per object, terminate communications with the selected cluster and seek a different cluster, etc.).

As an illustrative example, the policy and routing rules of the rules engine 142 may be coded to select from a certain subset of clusters (e.g., clusters $185_1$-$185_2$), numbering less than the available clusters (e.g., e.g., clusters $185_1$-$185_5$), based on at least a portion of the service policy level information 127 provided to the sensor $110_1$ or the on-premises management system 606, and/or retrieval of subscription information retrieved using a portion of the service policy level information 127 (e.g., Customer_ID) as described above. Thereafter, the selection of a particular cluster (e.g., cluster $185_1$) from the subset of clusters (e.g., clusters $185_1$-$185_2$) may be based on an evaluation of cluster selection values 157 associated with each cluster of the subset of clusters. This evaluation may include (i) a comparison of the current workload of each cluster (e.g., cluster $185_1$ and cluster $185_2$) as represented by certain cluster selection values 157; (ii) a determination as to which cluster(s) of the subset of clusters (e.g., clusters $185_1$ or $185_2$) support a software profile needed to process the type of object for analysis (e.g., PDF reader application, word processing application, a web browser) or a software profile required by a particular subscriber as represented by other cluster selection values 157; and/or (iii) a determination of the geographic region in which each cluster of the subset of clusters ($185_1$ or $185_2$) is located as represented by the service policy level information 127. It is contemplated that the ordering (or weighting) for some or all of these rules may vary for different versions of the policy and routing rules of the rules engine 142.

Other aspects of the operation of the object evaluation service 180 may also be influenced by the service policy level information 127 for the customer and operational metadata related to the clusters of the malware detection system. For example, the cloud broker 610 may cooperate with the system monitoring logic 630 and the cluster management system 190 to assure the analysis of an object by a selected cluster commences or completes prior to a latency threshold being surpassed, where the latency threshold is specified by an attribute, for example, an attributed associated with the subscription tier purchased by a customer or a customer-configured attribute, depending on the embodiment.

Besides assigning a sensor to a particular cluster, the cloud broker 610 may be configured to return statistical information 192 in response to the management query message 194. The statistical information 192 is based on one or more portions of the operational metadata 150 and is included as part of reporting data 193. The reporting data 193 may be aggregated and displayed, by the on-premises management system 606 or a centralized management system, in a manner that is directed to the operability of any customer (as the Customer_IDs may be cross-referenced to the Sensor_IDs) as well as any sensor, any cluster, or any compute node within one of the clusters. In particular, the management query message 194 may correspond to a request directed to the cloud broker 610 for metadata directed to the operability of a particular cluster, compute node, or sensor. After authenticating the node (e.g., sensor $110_1$) and/or the user of the node that submitted the management query message 194, the statistical information 192 may be returned back to that node (see FIG. 1) or routed to another node as the reporting data 193 (See FIG. 6A).

C. Subscription Service Levels

The malware detection system 100 may offer differentiated subscription levels or tiers of service, managed by the cloud broker 610 and the broker compute nodes $300_1$-$300_i$ (i>1) in association with the license/enrollment services (described above) or the authentication node (described below). According to one illustrative example, as described above, based on an identifier of the sensor (Sensor_ID) and/or an identifier of the customer (Customer_ID), the cloud broker 610 (acting as an initial coordinator) can query enrollment/license logic 650/640 (or authentication node 760 of FIG. 7) to obtain QoS information as part of the service policy level information (including one or more related attributes) stored in a database created for the customer. The customer can pay a premium fee to obtain a higher subscription level that guarantees minimal delays (low latencies) for commencement or completion of analysis of submissions. The cloud broker 610 (and/or a selected broker compute node $300_1$) can push all data submissions from sensors (and their corresponding subscribers who paid for this higher subscription level) to a high priority queue (an allocated part of queue 310) to handle the analysis of the data submission within a pre-agreed time allotment. In contrast data submissions handled by a non-premium level of service (lower subscription level) are provided to a different "standard" queue. Alternatively, the cloud broker 610 (and/or a selected broker compute node $300_1$) can tag entries in the queue (not shown) as premium requests and the analytic computer nodes will process a number of premium requests before resuming with processing a standard request.

As another example, for entry level service, the distributed queue 310 may be monitored by logic within the cloud broker 610 (e.g., accounting and license enforcement service described above), where the malware detection system may limit the total number of data submission per subscriber (subscriber site) per a prescribed time period (e.g., hour/day/week/month/year). Alternatively, the malware detection system may limit the data submissions based on a prescribed amount of content based on the level of service per the subscription (e.g., 1 gigabytes/second "GPS" of traffic for Tier 1 service level and 2 GPS for Tier 2 service level).

As yet another example, the data submissions from a certain customer (Customer_ID) or certain sensors (e.g., Sensor_ID) at subscriber sites 112 and/or 114 may be tracked by the cloud broker 610 (and/or selected broker compute node). Such tracking may be conducted where the customer is billed based on the overall usage of the object evaluation service 180. As a result, the level of subscription paid for by the customer may be used to control throughput, volume of submissions, and/or SLA (service level agreement).

Also, the malware detection system may differentiate service level commitments based on the type of object, for example, URL analysis may be performed in a shorter time than file analysis. Alternatively, different clusters or analytic compute nodes within a single cluster can be dedicated to certain tiers of service or types of object analysis (URLs, email, files, webpages) that may consume more or less time to complete.

IV. Cloud Broker Architecture

Figure 7:
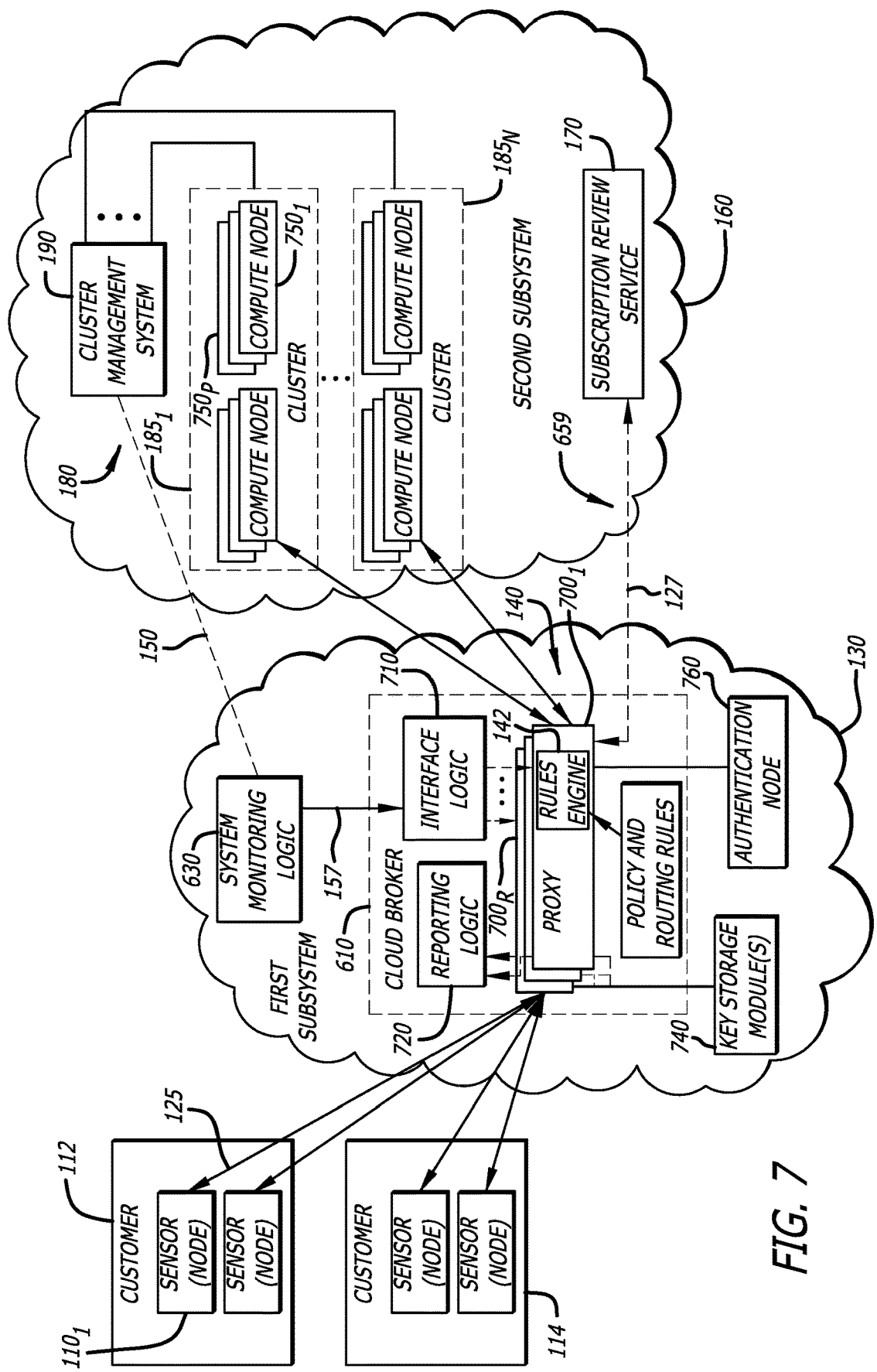
FIG. 7 is an exemplary embodiment of the analysis selection service of FIG. 1, including the cloud broker and the system monitoring logic.

FIG. 7 is an exemplary embodiment of the cloud broker 610 being a portion of the logic implemented within the analysis selection service 140 of FIG. 1. The cloud broker 610 offers centralized control of policy and routing decisions for object evaluation service 180 and a level of abstraction that precludes exposure of a particular broker compute node within the clusters $185_1$-$185_N$ to the sensors $110_1$-$110_M$. This level of abstraction may assist in compliance with certain outbound firewall rules at an enterprise network 600 of FIG. 6A that may require a single endpoint connection. According to this embodiment, the cloud broker 610 includes one or more proxy modules $700_1$-$700_R$ (R≥1), interface logic 710 and reporting logic 720.

Herein, the proxy module(s) $700_1$-$700_R$ include one or more software modules that collectively operate as a proxy server, which conducts load balancing of communications from the sensors $110_1$-$110_M$ as governed by the policy and routing rules of the rules engine 142. The load balancing is based, at least in part, on the cluster selection values 157 that are produced by the system monitoring logic 630 from the collected operational metadata 150. These cluster selection values 157 are made available to the proxy module(s) $700_1$-$700_R$ via interface logic 710, which provides a mechanism to propagate load-balancing updates to the proxy module $700_1$-$700_R$. Configured to select a cluster (and in one embodiment a particular broker compute node), the proxy module(s) $700_1$-$700_R$ may use the cluster selection values 157 as input parameters for the rule engine 142 which, based on the policy and routing rules, results in the selection of a particular cluster (e.g., cluster $185_1$) from the set of clusters $185_1$-$185_N$ available to a requesting sensor (e.g., sensor $110_1$).

According to another embodiment, besides the cluster selection values 157, service policy level information 127 within the analysis request message 125 from the sensor $110_1$ may be considered by at least one of the proxy modules (e.g., proxy module $700_R$) in determining a selected cluster (e.g., cluster $185_1$). For instance, as an example, the Sensor_ID included as part of the analysis request message 125 may be provided to at least one of the proxy modules (e.g., proxy module $700_R$), where the Sensor_ID may identify a geographic region of the sensor and the Sensor_ID may be used to retrieve additional service policy level information 127 from a data store within the first subsystem 130 or a data store within the second subsystem 160 (e.g., a database within the subscription review service 170). Additionally, or in the alternative, the Customer_ID may be included as part of the analysis request message 125 for use in accessing service policy level information 127 maintained within the cluster broker 610 or stored remotely from the cluster broker 610.

Depending on such information, the proxy module $700_R$ may utilize (i) the cluster selection values 157 accessible from the sensor monitoring node 630, (ii) the Sensor_ID and/or the Customer_ID and its associated service policy level information as other inputs for the policy and routing rules in determining what cluster (and/or broker compute node) to select for communications with the sensor $110_1$ (e.g., increasing the cluster selection value associated with a cluster (or compute node) within a certain geographic proximity to the sensor than clusters outside this geographic region). Also, a portion of the service policy level information 127 may be considered by at least one of the proxy modules (e.g., proxy module $700_1$) in determining the selected cluster (e.g., cluster $185_1$). For instance, the QoS level may cause the rules engine 142 to consider different cluster(s) or subsets of clusters to which the sensor $110_1$ is permitted to communicate. A high QoS level may provide the sensor $110_1$ with a greater number of possible clusters than a low QoS level.

The reporting logic 720 of the cloud broker 610 gathers metrics from the proxy module(s) $700_1$-$700_R$. These metrics may be aggregated to formulate statistical information that is searchable and available to metric collection tools for display.

The key storage modules 740 operates as a key value store that maintains state information, including information as to which clusters assigned to which sensors, keying material (e.g., keys) and relevant operational metadata for use by the cloud broker 610.

It is contemplated that the proxy modules $700_1$-$700_R$ may utilize information from an authentication node 760, which operates as a backend system in providing stored information (gathered from one or more subscription review services) that allows the proxy modules $700_1$-$700_R$ confirm the accuracy of the service policy level information 127 submitted by the sensor $110_1$. For instance, the authentication node 760 may be used to confirm the subscription, QoS level and/or permissions assigned to the sensor $110_1$. Additionally, the authentication node 760 may include additional information that, when provided to the rules engine 142, influences cluster selection for the sensor $110_1$. For instance, the Customer_ID may identify a subscriber that may be re-assigned to a higher or lower QoS level based on partial or non-payment of the subscription.

V. Alternative Cloud Broker Architecture

Figure 8:
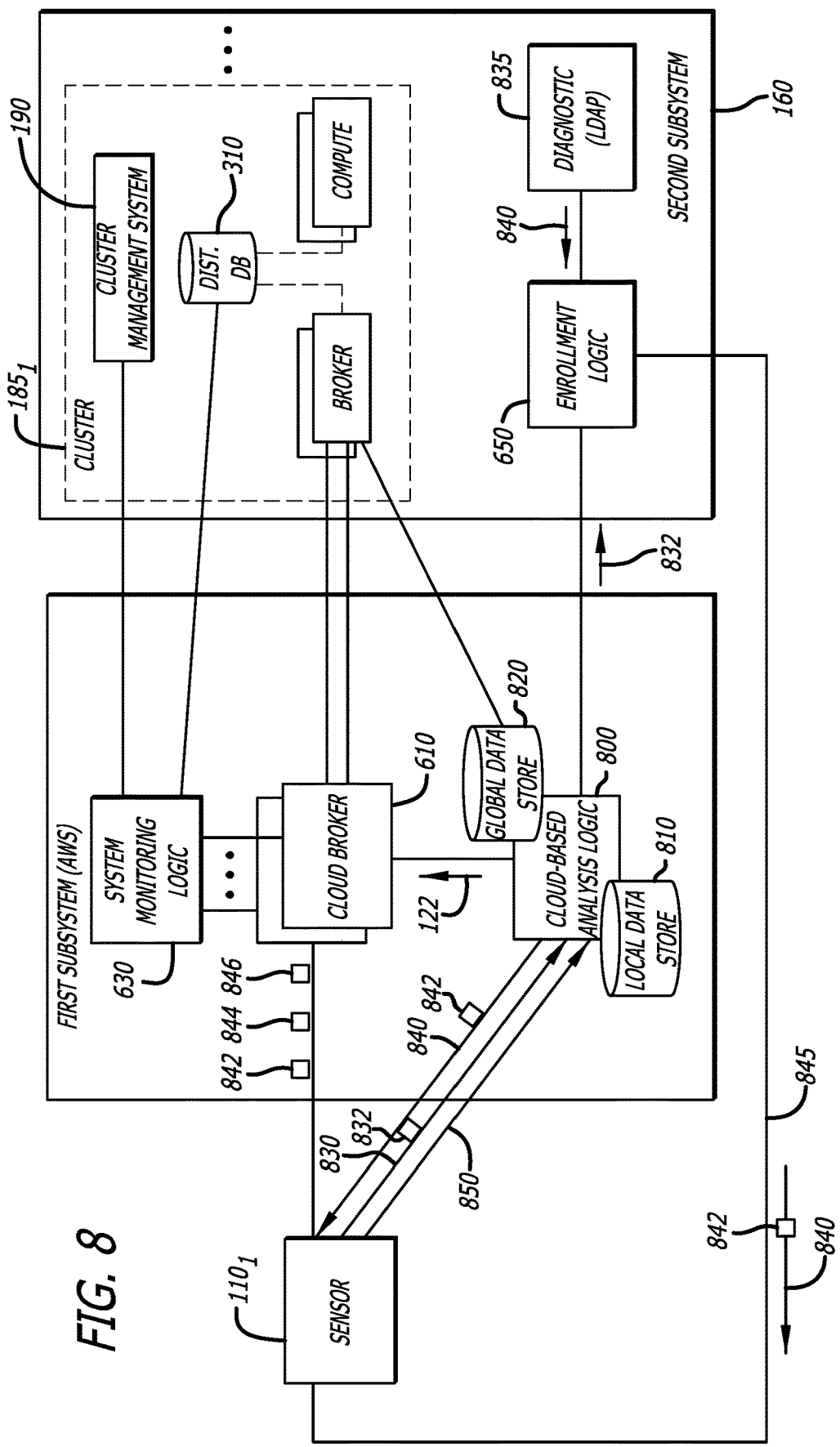
FIG. 8 is a block diagram of a second exemplary embodiment of a scalable, malware detection system.

FIG. 8 is a block diagram of a second exemplary embodiment of a scalable, malware detection system is shown. Herein, the first subsystem 130 further comprises cloud-based analysis logic 800, a local data store 810 and a global data store 820. The cloud-based analysis logic 800 provides operability during the enrollment phase and data submission phase of the malware analysis. In particular, the cloud-based analysis logic 800 is configured to receive an enrollment request message 830, which includes information 832 that identifies the sensor $110_1$ and/or the subscriber associated with the sensor $110_1$ (e.g., username, password, keying materials such as a key, etc.). Based on this information, the cloud-based analysis logic 800 routes the information 832 to the enrollment logic 650 located at the second subsystem 160.

As shown, the enrollment logic 650 accesses a directory (e.g., LDAP) 835 to authenticate the sensor $110_1$, and upon authentication, returns access control credentials 840 from the directory 835 to the enrollment logic 650. The access control credentials 840 may be provided to sensor $110_1$ via cloud-based analysis logic 800 or directly to the sensor $110_1$ via communication path 845. The access control credentials 840 may include URL 842. The keying material assigned to the sensor $110_1$ is provided to the cloud broker 610 so that the cloud broker 610 may terminate communications with a cluster (e.g., $185_1$) selected to operate with the sensor $110_1$. The URL 842 provides the sensor $110_1$ with an ability to access the cloud broker 610 so that the sensor $110_1$ can establish communications with the cloud broker 610 to provide a data submission (e.g., metadata 122) to commence analysis of the object 120. As an optional feature, along with the URL 842, the sensor $110_1$ may provide the Sensor_ID 844 and the service policy level information 846, which may be used to select the particular cluster (e.g., cluster $185_1$) for interaction with the sensor $110_1$.

After receipt of the credentials 840, the sensor $110_1$ may provide a data submission 850 to the cloud-based analysis logic 800, which conducts a preliminary analysis on the metadata associated with a corresponding object (e.g., metadata 122 associated with the object 120) to determine whether the object 120 is suspicious, malicious or benign.

The analysis may involve a comparison of contents within the global data store 820, which may include a black list and a white list. The "black list" includes identifiers for all objects previously detected as malicious by the cluster 185$_1$ while the "white list" includes identifiers for all objects previously detected as "benign" by the cluster 185$_1$ or any other cluster of the second subsystem 160. If the cloud-based analysis logic 800 determines that the object 120 is benign, such as confirming that a portion of the metadata associated with the object compares to an entry in the white list for examples, the cloud-based analysis logic 800 returns analytic results to the sensor 110$_1$ that identify that the object 120 is not malicious. However, the cloud-based analysis logic 800 is inconclusive or determines that the object 120 is malicious (e.g., the portion of the metadata compares to an entry in the black list), the metadata 122 is provided to the cloud broker 610 for routing to a selected cluster based, at least in part, on the operational metadata 150 retrieved by the system monitoring logic 630.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method for authenticating access to a subscription-based service that detects a potential cyber-attack, the method comprising:
    receiving, by a cloud broker, service policy level information that includes at least an identifier of a sensor, the sensor being configured to (i) obtain one or more objects, (ii) perform a preliminary analysis on the one or more objects, and (iii) determine whether further analyses of the one or more objects is to be conducted in response to the sensor, during the preliminary analysis, determining that the one or more objects correspond to one or more suspicious objects associated with a potential cyber-attack;
    receiving, by the cloud broker, information based on operational metadata, the operational metadata includes metadata that pertains to an operating state of one or more clusters of a plurality of clusters of the subscription-based service; and
    using, by a cloud broker, both the service policy level information and the information based on the operational metadata in (i) selecting a cluster from the plurality of clusters to analyze the one or more objects submitted by the sensor and (ii) establishing a communication session between the sensor and the cluster via the cloud broker to transmit the one or more objects from the sensor to the cluster.

2. The computerized method of claim 1, wherein the service policy level information includes the identifier of the sensor and the cloud broker using the identifier of the sensor in retrieval of the stored information being the service policy level information from one or more databases separate from the sensor and the cloud broker.

3. The computerized method of claim 1, wherein the service policy level information includes the identifier of the sensor and the cloud broker using at least the identifier of the sensor in selecting the cluster based on a geographical location of the sensor determined by the identifier of the sensor.

4. The computerized method of claim 3, wherein the cloud broker using the identifier of the sensor in selecting the cluster based on both the geographical location of the sensor and one or more customer-configurable attributes within the service policy level information that includes geographic restrictions in selecting one of the plurality of clusters as the cluster.

5. The computerized method of claim 1, wherein the selecting of the cluster by the cloud broker includes conducting an analysis by the cloud broker that the information based on the operational metadata meets or exceeds one or more performance-based attributes of the service policy level information.

6. The computerized method of claim 1, wherein the operational metadata includes a current rate of analysis supported by the cluster and the service policy level information includes a quality of service (QoS) attribute that identifies a minimum rate of analysis offered by a subscription level assigned to a customer associated with the sensor.

7. The computerized method of claim 1, wherein the operational metadata includes a guest image, including an operating system and one or more applications, supported by the cluster and the service policy level information includes an attribute that identifies a type of guest image supported by the cluster.

8. The computerized method of claim 1, wherein the cloud broker being configured to use an identifier assigned to a customer associated with the sensor to access performance-based attributes being part of the service policy level information within one or more databases separate from the cloud broker.

9. The computerized method of claim 8, wherein the selecting the cluster of the plurality of clusters in response to the information based on the operational metadata associated with the cluster satisfying a performance threshold set by the one or more performance criterion associated with the performance-based attributes.

10. The computerized method of claim 9 further comprising:
    monitoring, by the cloud broker, whether an analysis of an object, submitted by the sensor to the cluster subsequent to the one or more objects and during the communication session, continues to satisfy the performance threshold.

11. The computerized method of claim 10 further comprising:
    terminating the communication session upon determining that the analysis of the object fails to satisfy the performance threshold.

12. The computerized method of claim 1, wherein the cloud broker is positioned on a separate subsystem as the subscription review service and communicatively coupled to the subscription review service over a network.

13. A computerized method comprising:
    receiving metadata from a source node, the source node being configured to receive one or more objects, perform a preliminary analysis on the one or more objects, and determine whether further analyses of the one or more objects is to be conducted in response to the source node, during the preliminary analysis, determining that the one or more objects correspond to one or more suspicious objects associated with the potential cyber-attack;
    selecting a first cluster from a plurality of clusters by a cloud broker to analyze one or more objects received from the source node, the first cluster includes one or more compute nodes providing services in analyzing the one or more objects for malware; and
    wherein the selection of the first cluster of the plurality of clusters by the cloud broker is based, at least in part, on operational metadata received by the cloud broker from a management system monitoring operability of each cluster of the plurality of clusters and the source node to provide the one or more objects to the first cluster.

14. The computerized method of claim 13, wherein after the selecting of the first cluster of the plurality of clusters to analyze the one or more objects from the source node for malware, continuing by the first cluster to analyze all objects from the source node until a communication session between the source node and at least a broker compute node of the first cluster via the cloud broker is terminated.

15. The computerized method of claim 13, wherein prior to selecting the first cluster, the method further comprising:
collecting operational metadata from the management system; and
based on the operational metadata, generating data indicating a level of availability of each cluster of the plurality of clusters to analyze the one or more objects for malware received from the source node.

16. The computerized method of claim 15, wherein the collecting of the operational metadata is conducted by system monitoring logic and the operational metadata includes (i) metadata that identifies workload of each of the plurality of clusters and (ii) metadata that identifies a remaining queue length for a queue utilized to store metadata for use in retrieval of the one or more objects from the source node.

17. The computerized method of claim 15, wherein the collecting of the operational metadata includes collecting metadata that identifies a workload for each compute node of the first cluster of the plurality of clusters.

18. The computerized method of claim 15, wherein the collecting of the operational metadata includes collecting either (i) metadata that identifies a geographic location for the one or more compute nodes, or (ii) metadata that identifies a software profile for each of the one or more compute nodes, or (iii) metadata that identifies a rate of submission of objects by the source node to the cloud broker.

19. A system for detecting a cyber-attack, comprising:
a sensor associated with a first customer enrolled in a subscription service for a malware detection service, the sensor to capture a first object and perform a first malware analysis on the first object to determine whether the first object corresponds to a suspicious object potentially associated with a cyber-attack; and
a cloud broker communicatively coupled to the sensor, the cloud broker to (i) receive metadata associated with the suspicious object, (ii) select a cluster from the plurality of clusters to analyze the first object submitted by the sensor based, at least in part, on the metadata associated with the suspicious object, and (iii) establish a communication session between the sensor and the cluster that conducts a second malware analysis on the first object received from the sensor to determine whether the first object is associated with a cyber-attack.

20. The system of claim 19, wherein the cloud broker to receive the metadata including an identifier of the sensor and the cloud broker using the identifier of the sensor in retrieval of subscription information from one or more databases separate from the sensor and use of the subscription information in selecting the cluster of the plurality of clusters to analyze the first object.

21. The system of claim 20, wherein the cloud broker comprises a rules engine operating in accordance with a plurality of policy and routing rules to select the cluster of the plurality of clusters to analyze the first object.

22. The system of claim 21, wherein the plurality of policy and routing rules utilized by the rules engine are dynamic and reprogrammable.

23. The system of claim 19, wherein the cloud broker to receive the metadata including an identifier of the sensor being used to determine a geographical location of the sensor and a rules engine of the cloud broker relying, at least in part, on the geographical location of the sensor, being a parameter of a plurality of policy and routing rules, in selecting the cluster.

24. The system of claim 21, wherein the cloud broker to receive the metadata including the identifier of the sensor that is used by the cloud broker to access one or more databases of the malware detection service to collect subscription information being a parameter of the policy and routing rules that controls the rules engine in selecting the cluster of the plurality of clusters to operate with the sensor in analyzing at least the first object.

25. The system of claim 24, wherein the subscription information includes a subscription tier value that restricts or expands a number of clusters of the plurality of clusters capable of support object analysis for the sensor.

26. The system of claim 25, wherein the subscription information further includes a quality of service (QoS) threshold to be met by the selected cluster of the plurality of clusters, the QoS threshold being based on the subscription tier value.

27. The system of claim 24, wherein the subscription information includes a remediation setting representing a particular type of remediation selected by the first customer that restricts or expands a number of clusters of the plurality of clusters capable of supporting object analysis for the sensor.

28. The system of claim 24, wherein the subscription information further includes a customer notification scheme preference representing a particular notification scheme selected by the first customer that is considered in the selection of the cluster of the plurality of clusters.

29. The system of claim 20, wherein the cloud broker to further receive a second metadata from a source other than the sensor, the second metadata includes metadata that pertains to an operating state of the plurality of clusters.

30. The system of claim 29, wherein the cloud broker to select the cluster of the plurality of clusters to analyze the first object submitted by the sensor based, at least in part, on (i) whether the operating state of the cluster as provided by the second metadata meets or exceeds one or more performance-based attributes assigned to the first customer associated with the sensor or (ii) whether the second metadata identifying the cluster supports a type of guest image to process the first object during the second malware analysis.

31. The system of claim 20, wherein the cloud broker being configured to use the identifier of the sensor to access the performance-based attributes stored within the one or more databases.

32. The computerized method of claim 13, wherein the source node is a sensor.

33. The system of claim 19, wherein the cloud broker to monitor, during the communication session, whether the selected cluster of the plurality of clusters continues to satisfy one or more performance thresholds set by the subscription service.

34. The system of claim 19, wherein the cloud broker to terminate the communication session upon determining that the selected cluster of the plurality of clusters fails to satisfy the one or more performance thresholds set by the subscription service.

35. The system of claim 19, wherein the cloud broker is positioned on a separate subsystem as the plurality of clusters and is communicatively coupled to the plurality of clusters over a network.

36. A computerized method for authenticating access to a subscription-based service that detects a potential cyber-attack, the method comprising:

receiving, by a cloud broker, service policy level information that includes at least (i) an identifier of a sensor being used to access stored information and (ii) information associated with a subscription level assigned to a customer associated with the sensor, the sensor being configured to obtain one or more objects, perform a preliminary analysis on the one or more objects, and determine whether further analyses of the one or more objects is to be conducted in response to the sensor, during the preliminary analysis, determining that the one or more objects correspond to one or more suspicious objects associated with the potential cyber-attack;

receiving, by the cloud broker, information based on operational metadata, the operational metadata includes metadata that pertains to an operating state of one or more clusters of a plurality of clusters of the subscription-based service; and using, by a cloud broker, both the service policy level information and the information based on the operational metadata in (i) selecting a cluster from the plurality of clusters to analyze the one or more objects submitted by the sensor and (ii) establishing a communication session between the sensor and the cluster via the cloud broker, and wherein the operational metadata includes a current rate of analysis supported by the cluster.

37. The computerized method of claim 36, wherein the information associated with the subscription level includes a quality of service (QoS) attribute.

38. The computerized method of claim 1, wherein the preliminary analysis includes an analysis of data within an object of the one or more objects to determine whether that object is suspicious.

39. The computerized method of claim 1, wherein the preliminary analysis controls a number of suspicious objects or a frequency of suspicious objects to be made available for in-depth malware analysis.

40. The computerized method of claim 1, wherein the cluster includes one or more compute nodes.

41. The system of claim 19, wherein the cluster includes one or more compute nodes.

42. The computerized method of claim 36, wherein the cluster includes one or more compute nodes.

\* \* \* \* \*